US006578009B1

(12) United States Patent
Shinozaki

(10) Patent No.: US 6,578,009 B1
(45) Date of Patent: Jun. 10, 2003

(54) MARKETING STRATEGY SUPPORT SYSTEM FOR BUSINESS CUSTOMER SALES AND TERRITORY SALES INFORMATION

(75) Inventor: Noboru Shinozaki, Tokyo-to (JP)

(73) Assignee: Pioneer Corporation, Tokyo-To (JP)

( * ) Notice: Subject to any disclaimer, the term of this patent is extended or adjusted under 35 U.S.C. 154(b) by 0 days.

(21) Appl. No.: 09/506,703

(22) Filed: Feb. 18, 2000

(30) Foreign Application Priority Data

Feb. 18, 1999 (JP) ............................................ 11-040656

(51) Int. Cl.[7] ............................................... G06F 17/60
(52) U.S. Cl. ................. 705/10; 705/36; 705/1
(58) Field of Search ............................. 705/10, 14, 1, 705/36

(56) References Cited

U.S. PATENT DOCUMENTS

| | | | | |
|---|---|---|---|---|
| 4,853,852 A | * | 8/1989 | Rosen ........................... | 705/10 |
| 5,774,868 A | * | 6/1998 | Cragun et al. ................. | 705/10 |
| 6,026,370 A | * | 2/2000 | Jermyn .......................... | 705/14 |
| 6,073,112 A | * | 6/2000 | Geerlings ..................... | 705/14 |
| 6,366,890 B1 | * | 4/2002 | Usrey ........................... | 705/10 |

FOREIGN PATENT DOCUMENTS

WO  WO 0149099 A2  * 12/2001

OTHER PUBLICATIONS

Bobrow, Edwin. "The New Rules for Selling through Independent Reps". Marketing News. Nov 10, 1997. Vol. 31. Iss. 23. P. 13.*

Bird, Jane. "Logical guides to Marketing". Management Today. Feb. 1995. p. 58–62.*

Piccillo, Sandra. "How Marketers Benefit from Mapping Demos". Marketing News. Jun. 21, 1999. vol. 33. Iss. 13. p. 15–16.*

* cited by examiner

Primary Examiner—Tariq R. Hafiz
Assistant Examiner—Rebecca M. Bachner
(74) Attorney, Agent, or Firm—Young & Thompson

(57) ABSTRACT

A marketing strategy support system has a server apparatus and a plurality of client apparatuses which can be connected through a communication device to the server apparatus. The server apparatus is provided with file devices for storing business customer sales information, territory sales information and own-product-business customer sale information. The server apparatus is also provided with calculating devices for calculating a deviation value "a" of a sale Y1 in each business customer, a change rate Y2 to a term of the total sales in each territory, a deviation value "b" of the change rate Y2 in each territory, a sale X1 on an actually sold base corresponding to a sale of one's own company's product to each business customer, a deviation value "c" of the sale X1 in each business customer, a change rate X2 to a term of the sale X1 as an index indicative of a growth of a selling power in each business customer, a deviation value "d" of the change rate X2 in each business customer, a PPM (Product Portfolio Management) parameter Y indicative of an attractiveness of each business customer as a weighted average of the deviation values "a" and "b", and a PPM parameter X indicative of one's own company's strength of each business customer as a weighted average of the deviation values "c" and "d". Each of the client apparatuses is provided with a display device for displaying a scatter diagram in which the obtained PPM parameters Y and X are plotted on X-Y coordinates.

24 Claims, 8 Drawing Sheets

FIG. 3

| No | SHOP NAME | ... | VICTORY OR DEFEAT 205f ||||||||||||
| | | | AUG | SEP | OCT | NOV | DEC | JAN | FEB | MAR | APR | MAY | ... |
| 1 | E-den NAGOYA | ... | ● | ○ | ○ | ○ | ○ | ○ | ● | ○ | ○ | ○ | ... |
| 2 | E-den HEAD STORE | ... | ○ | ○ | ○ | ○ | ○ | ○ | ○ | ○ | ○ | ○ | ... |
| 3 | DENKIKAN | ... | ● | ● | ● | ● | ○ | ○ | ● | ○ | ● | ● | ... |
| 4 | MATSUMOTO ELECTRIC | ... | ● | ● | ○ | ● | ○ | ○ | ● | ○ | ○ | ● | ... |
| ... | ... | ... | ... | ... | ... | ... | ... | ... | ... | ... | ... | ... | ... |

FIG. 4
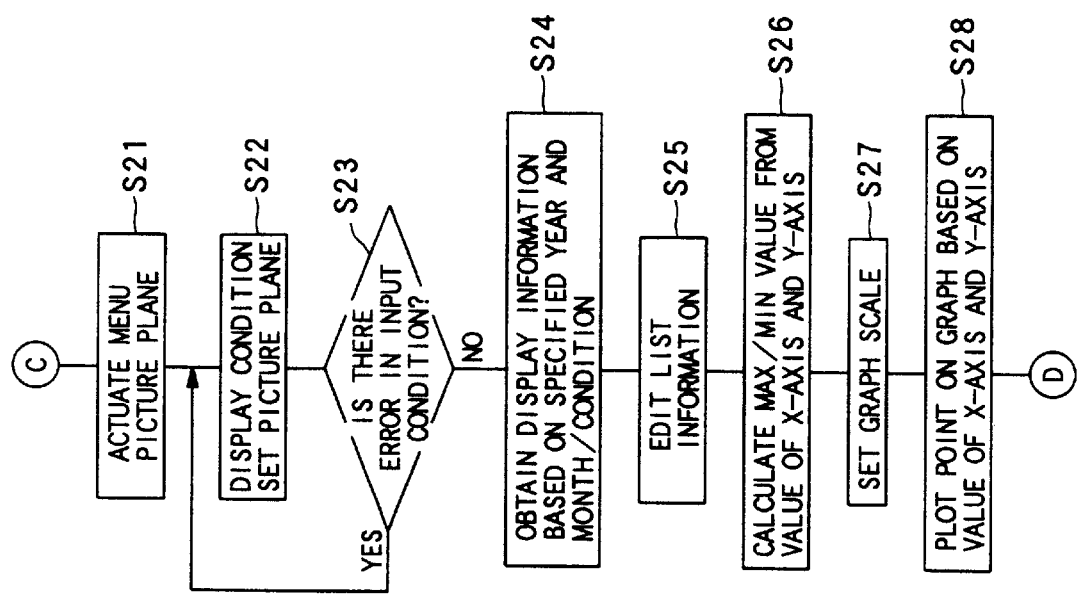
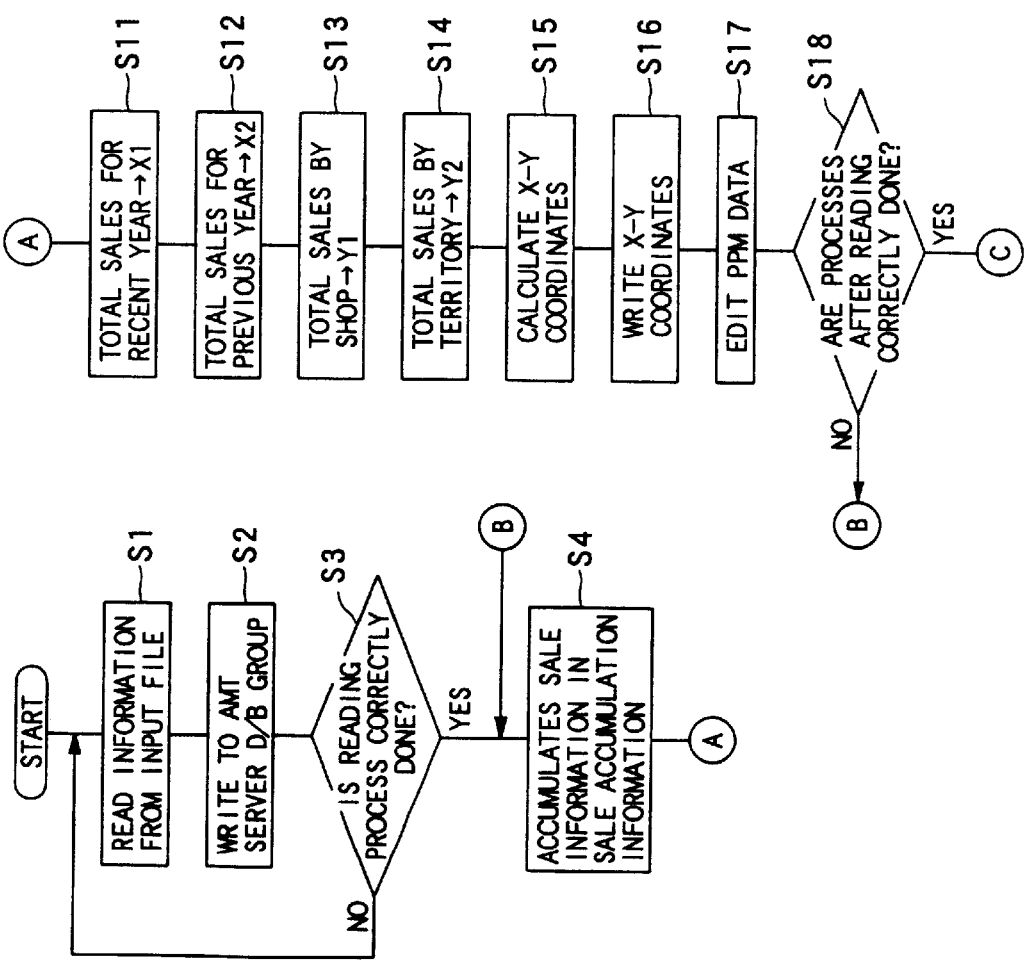

MARKETING STRATEGY SUPPORT SYSTEM FOR BUSINESS CUSTOMER SALES AND TERRITORY SALES INFORMATION

BACKGROUND OF THE INVENTION

1. Field of the Invention

The present invention relates to a marketing strategy support system for supporting the determination of strategy for business service with regard to one's own company's product sold through a number of shops and the determination of a budget amount for each shop and the like. The present invention also relates to a program storage device for storing a program and a computer data signal embodied in a carrier wave, which enable a computer to function as such a marketing strategy support system.

2. Description of the Related Art

An analysis referred to as product portfolio management (in this specification, referred to as PPM) or business customer portfolio analysis with regard to each business customer, is carried out as a part of traditional marketing strategy.

Here, the "business customer" in the present application implies a retail store or shop, a retail trader or dealer, a business connection, a company or juridical person for those and the like, who typically retail, sell, trade or deal with products for the own company (who is to carry out this PPM or business customer portfolio analysis) to thereby retail or sell the products to individual purchasers or end users.

According to this PPM or business customer portfolio analysis, for example, at first, the business customers are ranked by using the manner of ABC analysis, in manual business customer analysis which does not use a personal computer and the like. For example, the most important business customer is ranked as an A rank, an ordinary business customer is ranked as a B rank, and an unimportant business customer is ranked as a C rank. Accordingly, the marketing strategy is carried out in which the business power is distributed depending on such a rank. However, there are objective information and subjective information in the rank. Thus, its reliability is poor, and a personal difference resulting from the ranker is large, which may lead to only a roughly analyzed result.

In recent years, a technique of drawing a business customer portfolio diagram or a scatter diagram has been developed as a technique for business customer analysis using a computer. For example, there is a technique of plotting "the gross sales of each business customer" and "the share of one's own company" as a point having an X-coordinate and a y-coordinate, on a two-dimensional scatter diagram such that the gross sales of the respective business customers are on a Y (vertical) axis and the shares of one's own company in the respective business customers are on an X (horizontal) axis. Actually, as for the X-coordinate, as a target share of one's own company X=0, if the share is greater than the target, it is plotted as a positive value. If the share is less than the target, it is plotted as a negative value. As for the Y-coordinate, as the average gross sales Y=0, if the sale is greater than the average, it is plotted as a positive value. If it is less than the average, it is plotted as a negative value. If the thus-obtained scatter diagram is analyzed or evaluated, great importance is attached to which quadrant the point (business customer) plotted on the scatter diagram is located at.

Especially in a displaying method of drawing this type of scatter diagram by using the computer and the like, a graph tool function, such as a spreadsheet software available from the market or the like, is used to draw a number of graphs similar to each other to then analyze while considering them, in many cases. Information data gathered by a salesman or a head office are collectively processed when the process is necessary. The data are updated or changed on the spreadsheet type worksheet if the gathered information data are graphed by changing its extraction condition.

On the other hand, as a part of traditional marketing strategy, a sales target in a next year (hereafter, referred to as a master budget) is determined for each year or each settlement term, and also a budget for each business customer is determined (namely, target sales of one's own company product in each business customer). For the sake of the determinations, the following manner is typically used in recent years. That is, a computer, an electronic calculating device or the like is used to firstly distribute an entire master budget to each department by using market data and previous achievements data. Then, the breakdown is applied to each department similarly. Actually, for example, the budget calculation in which a database software and a spreadsheet software available from the market are used is carried out by each department in a distribution pattern, such as from a head office to a branch, from a branch to a sub-branch, from a sub-branch to a person in charge and from a person in charge to a business customer. Finally, a budget amount for each business customer is determined by the person in charge for the business customer.

However, according to the conventional technique using the above mentioned scatter diagram, the X-coordinate (namely, the gross sales of each business customer and the like) is calculated from a calculation result of a predetermined item group in order to calculate the X-coordinate. Independently of this calculation, the Y-coordinate (namely, the share of one's own company for each business customer and the like) is calculated from a calculation result of a predetermined item group in order to calculate the Y-coordinate. That is, the Y-coordinate and the X-coordinate are mutually determined such that the numerals, such as their maximum values, their minimum values, dispersions and the like, have no evident relations or no evident linkages between them. For this reason, there is no index on the scatter diagram which quantitatively indicates to what degree the achievements corresponding to the target have been attained, in accordance with a position of each point plotted on the X-Y coordinates as a result. That is, even if viewing the scatter diagram, there is no index which objectively or quantitatively indicates what degree of business power enables the target to be attained for each business customer corresponding to each point. This results in a problem that such quantitative judgement involving the marketing strategy (for example, what degree of increase or decrease of business power is desirable for attaining the target, with a current condition as a standard) must be made relying on the salesman's experience and intuition.

Also, according to the conventional technique using the above mentioned scatter diagram, the display format is limited to a range of the graph tool function such as the spreadsheet software or the like. Thus, this results in a problem that its display content cannot be analyzed while the extraction condition and the set condition are changed on the same picture plane and then the scatter diagram is updated. Moreover, the information data gathered by the salesman and the head office are collectively processed when the process is necessary. Thus, a real time process cannot be carried out. For this reason, it is difficult to optionally provide the information or data with regard to markets or business customers, and it is impossible to provide a timely picture plane. Hence, this also results in a problem that it is difficult or impossible to plan the marketing strategy while following the sequentially changing product market.

On the other hand, according to the conventional method of determining the budget for each business customer by using the computer and the like, the budget distribution work is carried out by a plurality of departments, and their manners are also different, which may cause the efficiency to be poor and also disable the standardized distribution. Moreover, the evaluation of business largely depends on the attainment of budget, which results in a problem that the budget distribution lacks fairness. Especially, there is a strong tendency that an index when the budget is distributed depends on previous achievements. Thus, this results in a problem that the budget distribution of using the objective indexes is difficult. Even if the data, such as a population, the number of households and the like, is used as the objective indexes, it is impossible to consider the mobility of business customers beyond an administrative district. Hence, the reliability of the index is inevitably dropped.

SUMMARY OF THE INVENTION

The present invention is proposed in view of the above mentioned problems. It is therefore an object of the present invention to provide a marketing strategy support system which provides objective and quantitative marketing strategy indexes useful for marketing strategy and in which the marketing strategy index can be shared by a plurality of salesmen, and a program storage device for storing a program as well as a computer data signal embodied in a carrier wave which enables a computer to function as such a marketing strategy support system.

The above object of the present invention can be also achieved by a first marketing strategy support system having a server apparatus and a plurality of client apparatuses which can be connected through a communication device to the server apparatus. The server apparatus is provided with: a first file device for storing business customer sales information indicative of a sale Y1 of each business customer with regard to at least two proximate terms; a second file device for storing territory sales information indicative of total sales in each territory with regard to at least two proximate terms (e.g., total sales in each area such as prefecture, city , ward, town, village etc., as for all analysis target commodities such as total sales of home electronics commodities, total sales of clothing commodities, total sales of foodstuffs and so on in each area); a third file device for storing own-product-business customer sale information indicative of a sale of one's own company's product to each business customer with regard to at least two proximate terms; a first calculating device for calculating a deviation value "a" of the sale Y1 in each business customer, in which all business customers targeted for an analysis are used as a population, in accordance with the business customer sales information stored in the first file device; a second calculating device for calculating a change rate Y2 to a term of the total sales in each territory indicated by the territory sales information stored in the second file device as an index indicative of a growth of a total buying power in each territory, and also calculating a deviation value "b" of the change rate Y2 in each territory, in which all territories targeted for the analysis are used as a population; a third calculating device for calculating a sale X1 on an actually sold base corresponding to a sale of one's own company's product to each business customer in accordance with the own-product-business customer sale information stored in the third file device, and also calculating a deviation value "c" of the sale X1 in each business customer, in which the all business customers are used as a population; a fourth calculating device for calculating a change rate X2 to a term of the sale X1 as an index indicative of a growth of a selling power in each business customer, and also calculating a deviation value "d" of the change rate X2 in each business customer, in which the all business customers are used as a population; a fifth calculating device for calculating a PPM parameter Y indicative of an attractiveness of each business customer as a weighted average of the deviation values "a" and "b", and also calculating a PPM parameter X indicative of one's own company's strength of each business customer as a weighted average of the deviation values "c" and "d"; a fourth file device for storing the calculated PPM parameters Y and X in correlation with each business customer; and a server side modem for transmitting the PPM parameters Y and X stored in the fourth file device, through the communication device to the client apparatus, in response to a request from the client apparatus. Each of the client apparatuses is provided with: a client side modem for obtaining the PPM parameters Y and X stored in the fourth file device through the communication device and the server side modem; and a display device for displaying a scatter diagram in which the obtained PPM parameters Y and X are plotted on X-Y coordinates.

According to the first marketing strategy support system of the present invention, at the server apparatus, the business customer sales information indicative of the sale Y1 of each business customer with regard to at least two proximate terms (e.g., the last year and two years ago) is stored in the first file device. The territory sales information indicative of total sales in each territory with regard to at least two proximate terms (e.g., the public trade statistics last time and that two years ago) is stored in the second file device. The own-product-business customer sale information indicative of the sale of one's own company's product to each business customer with regard to at least two proximate terms (e.g., each month, each account term) is stored in the third file device.

Then, the deviation value "a" of the sale Y1 in each business customer, in which all business customers targeted for the analysis are used as a population, is calculated by the first calculating device, in accordance with the business customer sales information stored in the first file device. The change rate Y2 with respect to the term of the total sales in each territory indicated by the territory sales information stored in the second file device (e.g., an annual change rate or an annual growing rate) is calculated by the second calculating device, as an index indicative of a growth of a total buying power in each territory. At this time, if the territory sales information as for the two consecutive terms is the information for the previous year and two years ago, the growing rate can be simply calculated as the annual change rate between those two. If the territory sales information is two times spanned for several years, it can be calculated with considering the interval between them to thereby convert the change rate for one year. Further, the deviation value "b" of the change rate Y2 in each territory, in which all territories targeted for the analysis are used as a population is calculated by the second calculating device. The sale X1 on the actually sold base corresponding to a sale of one's own company's product to each business customer is calculated by the third calculating device, in accordance with the own-product-business customer sale information stored in the third file device. Further, the deviation value "c" of the sale X1 in each business customer, in which the all business customers are used as a population is calculated by the third calculating device. Incidentally, such a conversion of the sales may be performed on the information indicative of the rough profit such as the average profit of each business customer, may be performed by setting the average rough profit for each business customer, or may be performed by setting a general average rough profit for all. Then, the change rate X2 with respect to the term of the sale X1 is calculated by the fourth calculating device, as an index indicative of a growth of a selling power in each business customer (e.g., the annual change rate or the annual growing rate). Further, the deviation value "d" of the change rate X2 in each business customer, in which the all business customers are used as a population, is calculated by the fourth calculating device. Then, the PPM parameter Y indicative of an attractiveness of each business customer as a weighted average of the deviation values "a" and "b" is calculated by the fifth calculating device. On the other hand, the PPM parameter X indicative of one's own company's strength of each business customer as a weighted average of the deviation values "c" and "d" is calculated by the fifth calculating device. Then, those PPM parameters Y and X are stored in the fourth file device in correlation with each business customer. Here, the analysis target business customers may be all business customers who deal with the own company products. Alternatively, some of the business customers may be preferably eliminated from the analysis target which are not suitable for the analysis in the same dimension such as a mail order business or a special style business.

After that, in response to a request from the client side modem equipped in one of the client apparatuses, those PPM parameters Y and X stored in the fourth file device are transmitted by the server side modem and are obtained by the client side modem through the communication device. Then, by the display device equipped in this one of the client apparatus, the scatter diagram, in which the obtained PPM parameters Y and X are plotted on X-Y coordinates, is displayed.

Therefore, when performing the business customer analysis with referring to the scatter diagram, the X axis and the Y axis have an evident relationship with each other, so that the straight line of Y=X becomes the balanced line between the attractiveness of the business customer and the marketing strength of own company. Thus, regardless of the strength or weakness of the attractiveness of the business customer or the marketing strength of own company, such a marketing strategy that the points plotted on the scattered diagram approach this balanced line becomes a very efficient marketing strategy. Consequently, for example, when allocating the marketing resource, which is certainly limited, to a plurality of business customers, by reducing the marketing power for the business customer corresponding to the point plotted near to the X axis than the balanced line and by increasing the marketing power for the business customer corresponding to the point plotted near to the Y axis than the balanced line, it is possible to increases the sales most efficiently by using the limited marketing power by relatively increasing the marketing power in short while relatively reducing the marketing power in excess on the whole.

The parameters Y and X are calculated at the site of the server apparatus. Thus, at the site of each client apparatus, it is possible to just receive the parameters Y and X, which have been calculated, through the communication device such as the wire or wireless communication line, and display the scatter diagram on the basis of the received information. Accordingly, the burden on each client apparatus is quite small, so that it is possible to promptly display the scatter diagram through the communication device at the site of each client apparatus. In addition, since the parameters Y and X which have been once calculated by the server apparatus can be commonly utilized by the client apparatuses, it is possible to improve the usage efficiency of the hardware resources, while it is possible to establish the objective marketing strategy on the basis of the same judgment standard at each client apparatus, which is very advantageous in a practical sense. Especially, it is possible to perform a collective process at the site of the server apparatus, as the sales information etc., is kept to be inputted from the same information source.

In the present invention, the deviation values c and d as for the sale X1, which is not on the wholesale price base but on the actually sold base, and the change rate X2 of the sale X1, which is not on the wholesale price base but on the actually sold base, are obtained. Therefore, it is possible to compare the deviation values a and b in the same dimension as for the sale Y1 for each business customer and the total sales in each territory, which should be essentially on the actually sold base. The relationship and the linkage between the PPM parameter Y and the PPM parameter X can become very precise. However, even if the sale and the change as for the PPM parameter X are on the wholesale price base when obtaining the PPM parameter X, by converting the sale Y1 of each business customer, which should be essentially on the actually sold base, to the value on the wholesale price base and by converting the total sales to the value on the wholesale price base when obtaining the PPM parameter Y, it is also possible to perform such a comparison between the PPM parameters X and Y in the same dimension, so that the relationship and the linkage between the PPM parameter Y and the PPM parameter X can become very precise. Alternatively, without matching the dimension in this manner, the PPM parameter X may be calculated on the wholesale price base while the PPM parameter Y may be calculated on the actually sold base. In this case, it is possible to roughly obtain the relationship and linkage between those two on the scatter diagram while reducing the process burden on the server apparatus.

In one aspect of the first marketing strategy support system of the present invention, each of the client apparatuses is further provided with an input device for inputting condition data indicative of a condition of specifying the PPM parameters Y and X corresponding to a desirable marketing strategy analysis target among the PPM parameters Y and X stored in the fourth file device. The client side modem transmits the condition data inputted through the input device through the communication device to the server side modem. The server side modem receives the transmitted condition data. The server apparatus is further provided with an extractor for extracting the PPM parameters Y and X meeting the condition represented by the received condition data from the fourth file device. The server side modem transmits the extracted PPM parameters Y and X through the communication device to the client side modem. The display device displays the scatter diagram in accordance with the PPM parameters Y and X received by the client side modem.

According to this aspect, at the site of one of the client apparatuses, the condition data indicative of a condition of specifying the PPM parameters Y and X corresponding to a desirable marketing strategy analysis target is inputted through the input device. Such an input may be performed by a salesman, who wants to make an analysis on a desired territory, a desired business customer group, a desired time and the like, as the occasion demands. Then, this condition data inputted through the input device is transmitted by the client side modem through the communication device to the server side modem. The server side modem receives the transmitted condition data. Then, at the site of the server apparatus, this condition data is received by the server side modem. Then, the PPM parameters Y and X meeting the condition represented by the received condition data are extracted by the extracting device from the fourth file device. Then, the extracted PPM parameters Y and X are transmitted by the server side modem through the communication device to the client side modem. By receiving this, the scatter diagram is displayed by the display device in accordance with the PPM parameters Y and X received by the client side modem.

Therefore, by appropriately changing the condition specifying the PPM parameters to be analyzed for the marketing strategy, it is possible to very easily and promptly display the scatter diagram as for the product group or the business customer group, or as for the territory or the time, which is very convenient.

In another aspect of the first marketing strategy support system of the present invention, at least one of the server apparatus and the plurality of client apparatuses is further provided with a setting device for setting at least one of a configuration ratio of the weighted average when the PPM parameter Y is calculated and a configuration ratio of the weighted average when the PPM parameter X is calculated.

According to this aspect, by the setting device which is equipped in at least one of the server apparatus and the plurality of client apparatuses, the configuration ratio of the weighted average can be changed when the PPM parameter Y is calculated. For example, it is possible to display a scatter diagram with attaching the importance onto the marketing power of each business customer or a scatter diagram with attaching the importance onto the growing rate of each business customer according to the intention of the operator. Further, the configuration ratio of the weighted average can be changed when the PPM parameter X is calculated. For example, it is possible to display a scatter diagram with attaching the importance onto the marketing power of own company at each business customer or a scatter diagram with attaching the importance onto the growing rate of own company at each business customer according to the intention of the operator.

In another aspect of the first marketing strategy support system of the present invention, the display device displays the scatter diagram in the scales respectively corresponding to the maximum values and the minimum values of the received PPM parameters Y and X.

According to this aspect, since the scatter diagram can be displayed by the display device in the scales respectively corresponding to the maximum values and the minimum values of the received PPM parameters Y and X, it is possible for the operator to automatically see the scatter diagram which is easy to see without the necessity of setting the scales at the client apparatus.

In another aspect of the first marketing strategy support system of the present invention, each of the plurality of client apparatuses is further provided with a specifying device for specifying an indication range of the scatter diagram.

According to this aspect, it is possible to see the portion, where the operator wants to carefully see, with magnifying it as the operator at the client apparatus specifies the indication range by the specifying device.

In another aspect of the first marketing strategy support system of the present invention, when obtaining at least one of the business customer sales information, the territory sales information and the own-product-business customer sale information which are respectively stored in the first, second and third file devices through the communication device, the display device displays the obtained information together with a name of a business customer corresponding to the obtained information in a predetermined format.

According to this aspect, at the client apparatus, not only the scatter diagram but also the business customer sales information, the territory sales information and or the own-product-business customer sale information can be displayed by the display device in the predetermined format together with the name of the corresponding business customer. Therefore, the operator such as a salesman can see such information simultaneously or before and after seeing the scatter diagram, which brings a great convenience upon making the marketing strategy.

In this aspect of the first marketing strategy support system of the present invention, when a point plotted on the scatter diagram is specified, the display device may display information corresponding to the specified point among the obtained information together with the business customer name in the predetermined format.

According to this aspect, when a point plotted on the scatter diagram is specified, the corresponding business customer name is displayed. Thus, the correspondence between each point and each business customer can be promptly grasped, which is very convenient. Further, together with this name of the business customer, the business customer sales information, the territory sales information and or the own-product-business customer sale information can be displayed in the predetermined format, which is even more convenient.

In another aspect of the first marketing strategy support system of the present invention, when the point plotted on the scatter diagram is specified, the display device displays a map in which a predetermined mark overlaps with a position of the business customer corresponding to the specified point in accordance with a map data.

According to this aspect, when the point plotted on the scatter diagram is specified, a map in which a predetermined mark overlaps with a position of the business customer corresponding to the specified point is displayed in accordance with the map data. Therefore, the operator such as a salesman can see such map simultaneously or before and after seeing the scatter diagram, which brings a great convenience upon making the marketing strategy in relation to the geographical condition.

In another aspect of the first marketing strategy support system of the present invention, the server apparatus is further provided with a fifth file device for storing rough profit information indicative of a rough profit of each business customer in correlation with each business customer, and the third calculating device calculates the sale X1 on the actually sold base in accordance with the rough profit information stored in the fifth file.

According to this aspect, since the rough profit information indicative of the rough profit of each business customer is stored in the fifth file device in correlation with each business customer, it is possible for the server apparatus for easily calculating the sale X1 on the actually sold base by the third calculating device. Such rough profit information may be maintained in the fifth file device by appropriately inputting it through an information input picture plane at the server apparatus.

The above object of the present invention can be also achieved by a second marketing strategy support system having a server apparatus and a plurality of client apparatuses which can be connected through a communication device to the server apparatus. The server apparatus is provided with: a first file device for storing business customer sales information indicative of a sale Y1 of each business customer with regard to at least two proximate terms; a second file device for storing territory sales information indicative of total sales in each territory with regard to at least two proximate terms; a third file device for storing own-product-business customer sale information indicative of a sale of one's own company's product to each business customer with regard to at least two proximate terms; a first calculating device for calculating a deviation value "a" of the sale Y1 in each business customer, in which all business customers targeted for an analysis are used as a population, in accordance with the business customer sales information stored in the first file device; a second calculating device for calculating a change rate Y2 to a term of the total sales in each territory indicated by the territory sales information stored in the second file device as an index indicative of a growth of a total buying power in each territory, and also calculating a deviation value "b" of the change rate Y2 in each territory, in which all territories targeted for the analysis are used as a population; a third calculating device for calculating a PPM parameter Y indicative of an attractiveness of each business customer as a weighted average of the deviation values "a" and "b"; a fourth file device for storing the calculated PPM parameter Y in correlation with each business customer; an inputting device for inputting master budget data indicative of a master budget M1, which is an annual target sales value of one's own company, and monthly configuration ratio data indicative of a monthly configuration ratio of the annual target sales value; a fourth calculating device for converting the inputted master budget M1 to a master budget M2 on an actually sold base, on the basis of the own-product-business customer sales information stored in the third file device; a fifth calculating device for distributing the master budget M2 on the actually sold base to each business customer as a business customer budget m2 on an actually sold base, in accordance with the PPM parameter Y stored in the fourth file device; a six calculating device for converting the distributed business customer budget m2 to a business customer budget m1 on a sales base for each business customer; a seventh calculating device for allocating the business customer budget m1 on the sales base to each month for each business customer in accordance with the monthly configuration ratio indicated by the inputted monthly configuration ratio data; a fifth file device for storing individual budget information indicative of the business customer budget m1 distributed to each month in correlation with each business customer; and a server side modem for transmitting the individual budget information stored in the fourth file device, through the communication device to the client apparatus, in response to a request from the client apparatus. Each of the client apparatuses is provided with: a client side modem for obtaining the individual budget information stored in the fourth file device through the communication device and the server side modem; and a display device for displaying the obtained individual budget information in a predetermined format.

According to the second marketing strategy support system of the present invention, at the server apparatus, the business customer sales information indicative of the sale Y1 of each business customer with regard to at least two proximate terms is stored in the first file device. The territory sales information indicative of total sales in each territory with regard to at least two proximate terms is stored in the second file device. The own-product-business customer sale information indicative of the sale of one's own company's product to each business customer with regard to at least two proximate terms is stored in the third file device.

Then, the deviation value "a" of the sale Y1 in each business customer, in which all business customers targeted for the analysis are used as a population, is calculated by the first calculating device, in accordance with the business customer sales information stored in the first file device. The change rate Y2 with respect to the term of the total sales in each territory indicated by the territory sales information stored in the second file device (e.g., an annual change rate or an annual growing rate) is calculated by the second calculating device, as an index indicative of a growth of a total buying power in each territory. Further, the deviation value "b" of the change rate Y2 in each territory, in which all territories targeted for the analysis are used as a population is calculated. Furthermore, the PPM parameter Y indicative of an attractiveness of each business customer as a weighted average of the deviation values "a" and "b" is calculated by the third calculating device. Then, this calculated PPM parameter Y is stored in the fourth file device in correlation with each business customer.

On the other hand, when the master budget data indicative of the master budget M1, which is an annual target sales value of one's own company and the monthly configuration ratio data indicative of a monthly configuration ratio of the annual target sales value are inputted through the input device, the inputted master budget M1 is converted by the fourth calculating device to a master budget M2 on an actually sold base, on the basis of the own-product-business customer sales information stored in the third file device. Then, the master budget M2 on the actually sold base is distributed to each business customer as a business customer budget m2 on an actually sold base by the fifth calculating device, in accordance with the PPM parameter Y stored in the fourth file device. Next, this distributed business customer budget m2 is converted to a business customer budget m1 on a sales base for each business customer, by the sixth calculating device. Next, the business customer budget m1 on the sales base is allocated to each month for each business customer by the seventh calculating device, in accordance with the monthly configuration ratio indicated by the monthly configuration ratio data, which is inputted through the input device. Then, such individual budget information indicative of the business customer budget m1 distributed to each month is stored in the fifth file device in correlation with each business customer.

After that, in response to a request from the client side modem equipped in one of the client apparatuses, the individual budget information stored in the fourth file device is obtained by this client side modem through the communication device and the server side modem. Then, the obtained individual budget information is displayed in the predetermined format by the display device equipped in this one client apparatus.

Therefore, in accordance with the strength and weakness of the attractiveness of each business customer (e.g., the growing rate at the territory where each shop is located, the capacity of the sales of each shop or each juridical person), it is possible to determine the budget for each business customer objectively and automatically. Thus, the marketing strategy (e.g., a plan for the arrangement of a person, or an investment for various cost such as an exhibition or event)

in accordance with the budget for each month and for each business customer determined by the present invention can become the most efficient marketing strategy in a practical sense. Further, in case of changing the master budget M1 in the middle of the account term (i.e., in case of reducing or increasing the budget), it is possible to determine again the individual budget information quite easily. Furthermore, the individual budget information is calculated at the site of the server apparatus. Thus, at the site of each client apparatus, it is possible to just receive the individual budget information, which has been calculated, through the communication device such as the wire or wireless communication line, and display the scatter diagram on the basis of the received information. Accordingly, the burden on each client apparatus is quite small, so that it is possible to promptly display the scatter diagram through the communication device at the site of each client apparatus. In addition, since the individual budget information which has been once calculated by the server apparatus can be commonly utilized by the client apparatuses, it is possible to improve the usage efficiency of the hardware resources, while it is possible to establish the objective marketing strategy on the basis of the same judgment standard at each client apparatus, which is very advantageous in a practical sense. Especially, it is possible to perform a collective process at the site of the server apparatus, as the sales information etc., is kept to be inputted from the same information source.

In the present invention, the budget distribution to each business customer by means of the PPM parameter Y is performed not on the wholesale price base but on the actually sold base. Therefore, it is possible to perform the distribution process as for the sale Y1 for each business customer and the total sales in each territory, which should be essentially on the actually sold base, in the same dimension as the deviation values a and b. However, even if the sale Y1 of each business customer, which should be essentially on the actually sold base, is converted to the value on the wholesale price base and the total sales is converted to the value on the wholesale price base when obtaining the PPM parameter Y, it is also possible to perform such a distribution process in the same dimension. Alternatively, the system may be constructed such that the distribution process is performed on the basis of the PPM parameter on the actually sold base for the master budget M1 on the wholesale price base as it is without matching the dimension in this manner, to thereby perform a rough distribution process while reducing the process burden.

In one aspect of the second marketing strategy support system of the present invention, the inputting device is adapted to distribute as a business customer budget the master budget M1 to one or a plurality of business customers of an analysis non-target among all business customers. The fourth calculating device converts, in place of the inputted master budget M1, a portion M1 other than the business customer budget for the business customer or business customers of the analysis non-target in the master budget M1, to the master budget M2 on the actually sold base. The seventh calculating device allocates one portion of the master budget M1 distributed to the business customer or business customers of the analysis non-target, to each month, in accordance with the monthly configuration ratio indicated by the inputted monthly configuration ratio data.

According to this aspect, the master budget M1 is distributed as a business customer budget by the inputting device to one or a plurality of business customers of an analysis non-target among all business customers. Namely, all business customers selling own company's product may be the business customer of the analysis. Alternatively, some of the business customers may be preferably eliminated from the analysis target which are not suitable for the analysis in the same dimension such as a mail order business or a special style business. Thus, with respect to the business customer of the analysis non-target, a manual distribution process is performed by the inputting device on the basis of the data on the actually sold base. Then, in this case, in place of the inputted master budget M1, the portion M1' other than the business customer budget for the business customer or business customers of the analysis non-target in the master budget M1 is converted to the master budget M2 on the actually sold base, by the fourth calculating device. Then, by the seventh calculating device, one portion of the master budget M1 distributed to the business customer or business customers of the analysis non-target is allocated to each month, in accordance with the monthly configuration ratio indicated by the imputted monthly configuration ratio data. In addition, it is preferable to add a flag indicating whether or not each business customer is to be included in the target analysis with respect to the business customer identification information assigned to each business customer in advance, and to appropriately maintain in the server apparatus.

In another aspect of the second marketing strategy support system of the present invention, each of the client apparatuses is further provided with an input device for inputting condition data indicative of a condition of specifying the individual budget information corresponding to a desirable marketing strategy analysis target among the individual budget information stored in the fifth file device. The client side modem transmits the condition data inputted through the input device through the communication device to the server side modem. The server side modem receives the transmitted condition data. The server apparatus is further provided with an extractor for extracting the individual budget information meeting the condition represented by the received condition data from the fifth file device. The server side modem transmits the extracted individual budget information through the communication device to the client side modem. The display device displays the individual budget information received by the client side modem.

According to this aspect, at the site of one of the client apparatuses, the condition data indicative of a condition of specifying the individual budge information, which corresponds to a desirable marketing strategy analysis target among the individual budget information for a plurality of business customers or for a long term, is inputted through the input device. Such an input may be performed by a salesman, who wants to m make an analysis on a desired territory, a desired business customer group, a desired time and the like, as the occasion demands. Then, this condition data inputted through the input device is transmitted by the client side modem through the communication device to the server side modem. The server side modem receives the transmitted condition data. Then, at the site of the server apparatus, this condition data is received by the server side modem. Then, the individual budge information meeting the condition represented by the received condition data is extracted by the extracting device from the fifth file device. Then, the extracted individual budge information is transmitted by the server side modem through the communication device to the client side modem. By receiving this, the individual budget information is displayed by the display device in accordance with the individual budge information received by the client side modem.

Therefore, by appropriately changing the condition specifying the individual budget information to be analyzed for the marketing strategy, it is possible to very easily and promptly display the scatter diagram as for the product group or the business customer group, or as for the territory or the time, which is very convenient.

In another aspect of the first marketing strategy support system of the present invention, at least one of the server apparatus and the plurality of client apparatuses is further provided with a setting device for setting a configuration ratio of the weighted average when the PPM parameter Y is calculated.

According to this aspect, when the PPM parameter Y is calculated, the configuration ratio of the weighted average can be changed by the setting device. By this, it is possible to display the individual budget information with attaching the importance onto the marketing power of each business customer or the individual budget information with attaching the importance onto the growing rate of each business customer according to the intention of the operator.

In another aspect of the first marketing strategy support system of the present invention, the server apparatus is further provided with a sixth file device for storing rough profit information indicative of a rough profit in correlation with each business customer. The fourth calculating device converts the inputted master budget M1 to the master budget M2 on the actually sold base, on the basis of the rough profit information stored in the sixth file device. The six calculating device converts the distributed business customer budget m2 to the business customer budget m1 on the sales base on the basis of the rough profit information stored in the sixth file device.

According to this aspect, the rough profit information indicative of a rough profit is stored in the sixth file device in correlation with each business customer. Thus, it is possible for the fourth calculating device to easily convert the inputted master budget M1 to the master budget M2 on the actually sold base, and also possible for the six calculating device to easily convert the distributed business customer budget m2 to the business customer budget m1 on the sales base. Such rough information may be calculated on the basis of the sales information or marketing profit information on the aforementioned statement of account etc., for example, or may be obtained by actually inquiring and investigating. Further, such rough information may be appropriately inputted through information input picture plane to thereby maintain the sixth file device.

In another aspect of the first marketing strategy support system of the present invention, when obtaining at least one of the business customer sales information, the territory sales information and the own-product-business customer sale information which are respectively stored in the first, second and third file devices through the communication device, the display device displays the obtained information together with a name of a business customer corresponding to the obtained information in a predetermined format.

According to this aspect, at the client apparatus, not only the individual budget information but also the business customer sales information, the territory sales information and or the own-product-business customer sale information can be displayed by the display device in the predetermined format together with the name of the corresponding business customer. Therefore, the operator such as a salesman can see such information simultaneously or before and after seeing the individual budget information, which brings a great convenience upon making the marketing strategy. Especially, the plan and achievement management can be made easy, by displaying the individual budget information for each business customer and for each month simultaneously with the achievement information (e.g., the business customer sales information) and, more preferably, by arranging them (e.g., arranging or superimposing it by a bar graph etc., for each month).

In another aspect of the first or second marketing strategy support system of the present invention, the first calculating device calculates, in accordance with product ratio information indicative of a ratio of a sales values of a specific product group with respect to a total sales value for each business customer in addition to the business customer sales information stored in the first file device, the deviation value "a" of a specific product group sale Y1', which is obtained by multiplying the sale Y1 with the ratio of the sales values of the specific product group for each business customer, in place of the sale Y1.

According to this aspect, in accordance with the business customer sales information indicative of the specific product group sale Y1' as for the specific product group in place of all the products dealt with by each business customer, the deviation value "a" of the specific product group sale Y1', in which all business customers targeted for the analysis are used as a population, is calculated. Then, the PPM parameter Y indicative of the attractiveness of each business customer is calculated as the weighted average of thus calculated deviation values a and b. Therefore, by the display device at the client apparatus, it is possible to display the scatter diagram or the individual budget information, to which the specific product group corresponding to the marketing target of own company is more precisely reflected.

In another aspect of the first or second marketing strategy support system of the present invention, the server apparatus is further provided with a taking-in device for taking-in the business customer sales information through the communication device from an information source, in which the business customer sales information is accumulated. The third file device updates a content thereof by the taken-in business customer sales information.

According to this aspect, it is possible by the taking-in device to take-in the new business customer sales information promptly. By this, it is possible to update the business customer sales information stored in the third file device by the new information without delay. Therefore, it is possible to obtain the scatter diagram and the individual budget information based on the newest information.

The above object of the present invention can be also achieved by a third marketing strategy support system provided with: a first file device for storing business customer sales information indicative of a sale Y1 of each business customer with regard to at least two proximate terms; a second file device for storing territory sales information indicative of total sales in each territory with regard to at least two proximate terms; a third file device for storing own-product-business customer sale information indicative of a sale of one's own company's product to each business customer with regard to at least two proximate terms; a first calculating device for calculating a deviation value "a" of the sale Y1 in each business customer, in which all business customers targeted for an analysis are used as a population, in accordance with the business customer sales information stored in the first file device; a second calculating device for calculating a change rate Y2 to a term of the total sales in each territory indicated by the territory sales information stored in the second file device as an index indicative of a growth of a total buying power in each territory, and also calculating a deviation value "b" of the change rate Y2 in each territory, in which all territories targeted for the analysis are used as a population; a third calculating device for calculating a PPM parameter Y indicative of an attractiveness of each business customer as a weighted average of the deviation values "a" and "b"; a fourth file device for storing the calculated PPM parameter Y in correlation with each business customer; an inputting device for inputting master budget data indicative of a master budget M1, which is an annual target sales value of one's own company, and monthly configuration ratio data indicative of a monthly configuration ratio of the annual target sales value; a fourth calculating device for converting the inputted master budget M1 to a master budget M2 on an actually sold base, on the basis of the own-product-business customer sales information stored in the third file device; a fifth calculating device for distributing the master budget M2 on the actually sold base to each business customer as a business customer budget m2 on an actually sold base, in accordance with the PPM parameter Y stored in the fourth file device; a six calculating device for converting the distributed business customer budget m2 to a business customer budget m1 on a sales base for each business customer; a seventh calculating device for allocating the business customer budget m1 on the sales base to each month for each business customer in accordance with the monthly configuration ratio indicated by the inputted monthly configuration ratio data; and a fifth file device for storing individual budget information indicative of the business customer budget m1 distributed to each month in correlation with each business customer.

Namely, the third marketing strategy support system has only the server apparatus of the above described second marketing strategy support system of the present invention, which is sufficiently useful to collectively perform the budget distribution for each business customers or each month at the server apparatus, without the client apparatus.

The above object of the present invention can be also achieved by a first program storage device readable by a computer, tangibly embodying a program of instructions executable by the computer to perform method processes for transmitting PPM parameters Y and X to a plurality of client apparatuses, each of which is connectable to the server apparatus through a communication device and is provided with (i) a client side modem for obtaining the PPM parameters Y and X through the communication device and (ii) a display device for displaying a scatter diagram in which the obtained PPM parameters Y and X are plotted on X-Y coordinates. The method processes include: a first file process of storing business customer sales information indicative of a sale Y1 of each business customer with regard to at least two proximate terms; a second file process of storing territory sales information indicative of total sales in each territory with regard to at least two proximate terms; a third file process of storing own-product-business customer sale information indicative of a sale of one's own company's product to each business customer with regard to at least two proximate terms; a first calculating process of calculating a deviation value "a" of the sale Y1 in each business customer, in which all business customers targeted for an analysis are used as a population, in accordance with the business customer sales information stored by the first file process; a second calculating process of calculating a change rate Y2 to a term of the total sales in each territory indicated by the territory sales information stored by the second file process as an index indicative of a growth of a total buying power in each territory, and also calculating a deviation value "b" of the change rate Y2 in each territory, in which all territories targeted for the analysis are used as a population; a third calculating process of calculating a sale X1 on an actually sold base corresponding to a sale of one's own company's product to each business customer in accordance with the own-product-business customer sale information stored by the third file process, and also calculating a deviation value "c" of the sale X1 in each business customer, in which the all business customers are used as a population; a fourth calculating process of calculating a change rate X2 to a term of the sale X1 as an index indicative of a growth of a selling power in each business customer, and also calculating a deviation value "d" of the change rate X2 in each business customer, in which the all business customers are used as a population; a fifth calculating process of calculating a PPM parameter Y indicative of an attractiveness of each business customer as a weighted average of the deviation values "a" and "b", and also calculating a PPM parameter X indicative of one's own company's strength of each business customer as a weighted average of the deviation values "c" and "d"; a fourth file process of storing the calculated PPM parameters Y and X in correlation with each business customer; and a transmitting process of transmitting the PPM parameters Y and X stored by the fourth file process, through the communication device to the client apparatus, in response to a request from the client apparatus.

According to the first program storage device of the present invention, as the computer reads in and executes the program stored therein, it is possible to realize the above described first marketing strategy support system of the present invention on the computer.

The above object of the present invention can be also achieved by a second program storage device readable by a computer, tangibly embodying a program of instructions executable by the computer to perform method processes for transmitting individual business customer budget information to a plurality of client apparatuses, each of which is connectable to the server apparatus through a communication device and is provided with (i) a client side modem for obtaining the individual business customer information through the communication device and (ii) a display device for displaying the obtained individual business customer budget information in a predetermined format. The method processes include: a first file process of storing business customer sales information indicative of a sale Y1 of each business customer with regard to at least two proximate terms; a second file process of storing territory sales information indicative of total sales in each territory with regard to at least two proximate terms; a third file process of storing own-product-business customer sale information indicative of a sale of one's own company's product to each business customer with regard to at least two proximate terms; a first calculating process of calculating a deviation value "a" of the sale Y1 in each business customer, in which all business customers targeted for an analysis are used as a population, in accordance with the business customer sales information stored by the first file process; a second calculating process of calculating a change rate Y2 to a term of the total sales in each territory indicated by the territory sales information stored by the second file process as an index indicative of a growth of a total buying power in each territory, and also calculating a deviation value "b" of the change rate Y2 in each territory, in which all territories targeted for the analysis are used as a population; a third calculating process of calculating a PPM parameter Y indicative of an attractiveness of each business customer as a weighted average of the deviation values "a" and "b"; a fourth file process of storing the calculated PPM parameter Y in correlation with each business customer; an inputting process of inputting master budget data indicative of a master budget M1, which is an annual target sales value of one's own company, and monthly configuration ratio data indicative of a monthly configuration ratio of the annual target sales value; a fourth calculating process of converting the inputted master budget M1 to a master budget M2 on an actually sold base, on the basis of the own-product-business customer sales information stored by the third file process; a fifth calculating process of distributing the master budget M2 on the actually sold base to each business customer as a business customer budget m2 on an actually sold base, in accordance with the PPM parameter Y stored by the fourth file process; a six calculating process of converting the distributed business customer budget m2 to a business customer budget m1 on a sales base for each business customer; a seventh calculating process of allocating the business customer budget m1 on the sales base to each month for each business customer in accordance with the monthly configuration ratio indicated by the inputted monthly configuration ratio data; a fifth file process of storing individual budget information indicative of the business customer budget m1 distributed to each month in correlation with each business customer; and a transmitting process for transmitting the individual budget information stored by the fourth file process, through the communication device to the client apparatus, in response to a request from the client apparatus.

According to the second program storage device of the present invention, as the computer reads in and executes the program stored therein, it is possible to realize the above described second marketing strategy support system of the present invention on the computer.

The above object of the present invention can be also achieved by a first computer data signal embodied in a carrier wave and representing a series of instructions which cause a computer to perform method processes for transmitting PPM parameters Y and X to a plurality of client apparatuses, each of which is connectable to the server apparatus through a communication device and is provided with (i) a client side modem for obtaining the PPM parameters Y and X through the communication device and (ii) a display device for displaying a scatter diagram in which the obtained PPM parameters Y and X are plotted on X-Y coordinates. The method processes include: the first file process, the second file process, the third file process, the first calculating process, the second calculating process, the third calculating process, the fourth calculating process, the fifth calculating process, the fourth file process, and the transmitting process in the above described first program storage device of the present invention.

According to the first computer data signal embodied in the carrier wave of the present invention, as the computer downloads and executes the program in the computer data signal, it is possible to realize the above described first marketing strategy support system of the present invention on the computer.

The above object of the present invention can be also achieved by a second computer data signal embodied in a carrier wave and representing a series of instructions which cause a computer to perform method processes for transmitting individual business customer budget information to a plurality of client apparatuses, each of which is connectable to the server apparatus through a communication device and is provided with (i) a client side modem for obtaining the individual business customer information through the communication device and (ii) a display device for displaying the obtained individual business customer budget information in a predetermined format. The method processes include the first file process, the second file process, the third file process, the first calculating process, the second calculating process, the third calculating process, the fourth file process, the inputting process, the fourth calculating process, the fifth calculating process, the six calculating process, the seventh calculating process, the fifth file process, and the transmitting process in the above described second program storage device of the present invention.

According to the second computer data signal embodied in the carrier wave of the present invention, as the computer downloads and executes the program in the computer data signal, it is possible to realize the above described second marketing strategy support system of the present invention on the computer.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3 is a plan view showing another example of the picture plane displayed on the display of the first embodiment;

FIG. 4 is a flowchart (I) showing an operation of the first embodiment;

DETAILED DESCRIPTION OF THE PREFERRED EMBODIMENTS

First Embodiment

Figure 1:
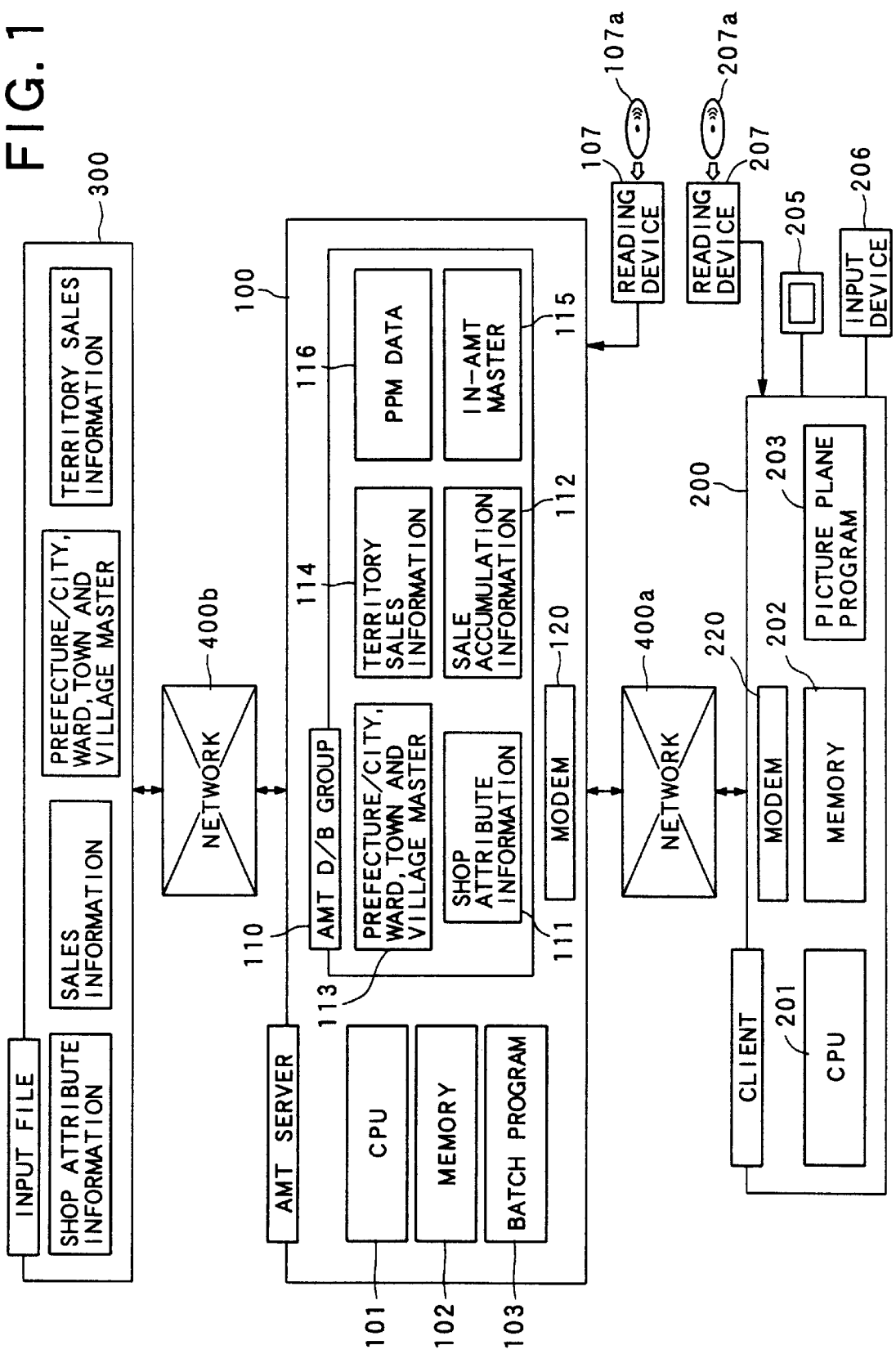
FIG. 1 is a block diagram showing a whole configuration of a marketing strategy support system of a first embodiment in the present invention.
Figure 2:
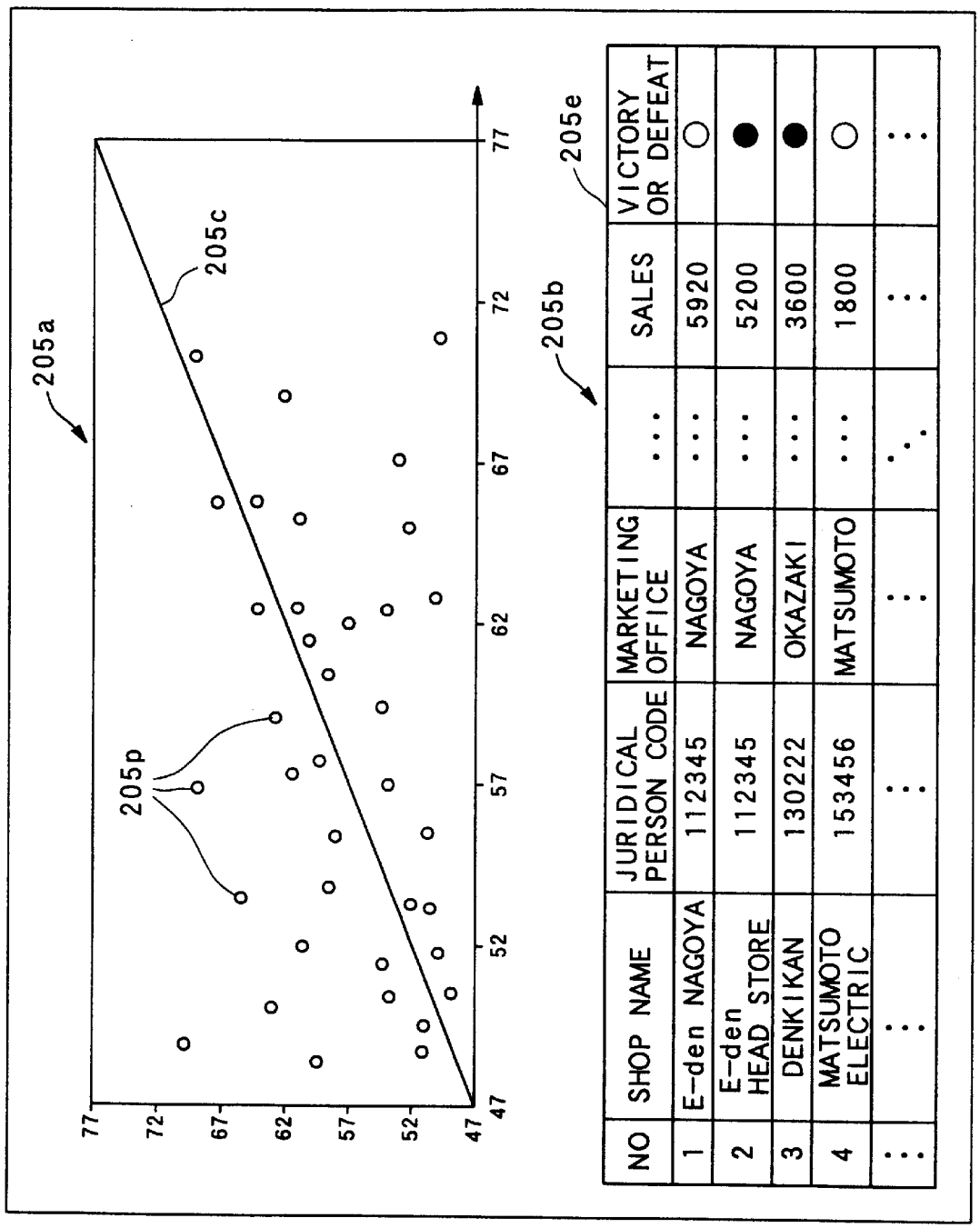
FIG. 2 is a plan view showing an example of a picture plane displayed on a display of the first embodiment.
Figure 5:
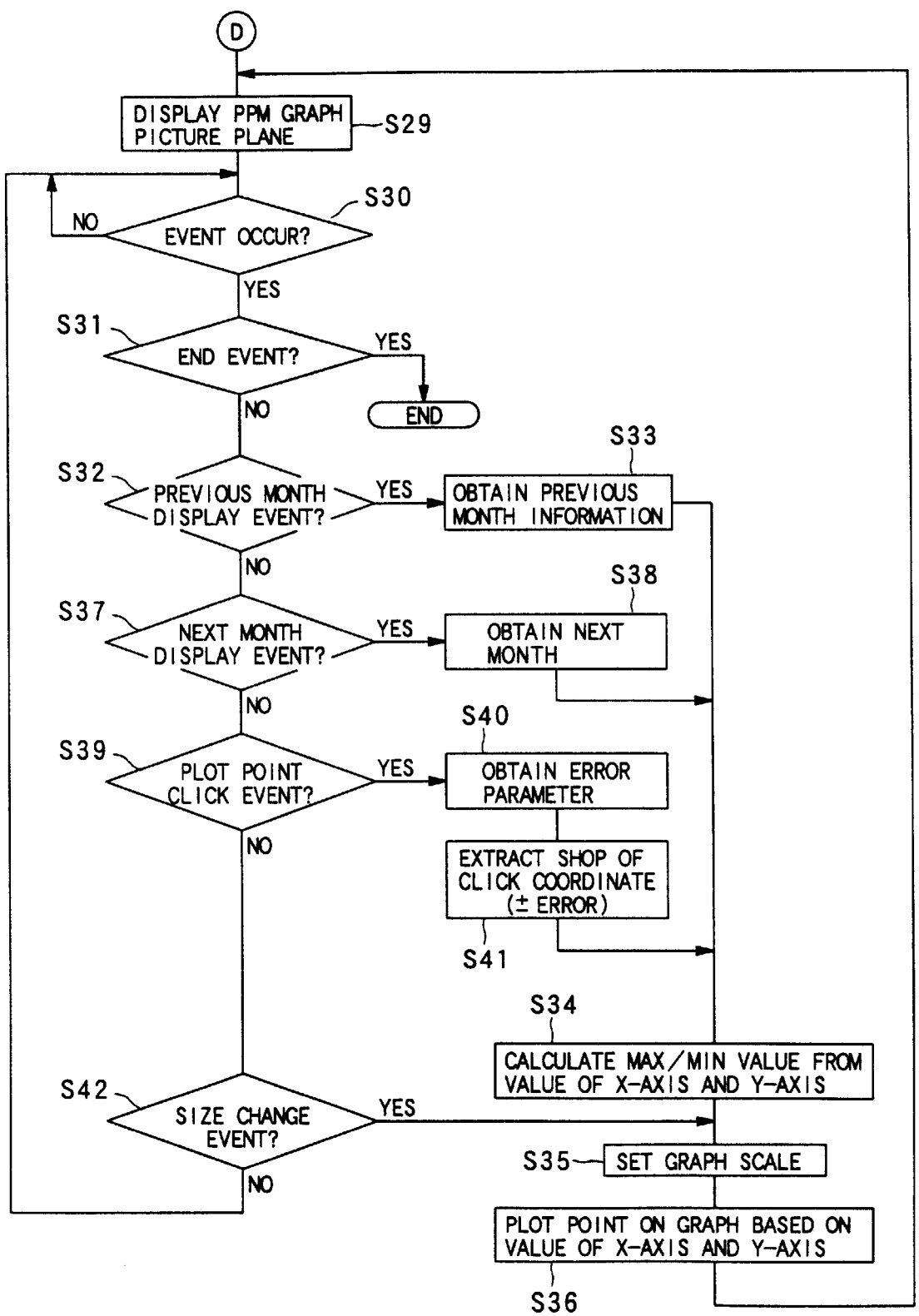
FIG. 5 is a flowchart (II) showing an operation of the first embodiment.

A first embodiment of the present invention is explained with reference to FIGS. 1 to 5. Here, FIG. 1 is a block diagram showing the system configuration of the first embodiment. FIG. 2 is a plan view showing an example of a picture plane that can be displayed in the first embodiment. FIG. 3 is a plan view showing another example of a picture plane that can be displayed in the first embodiment. And, FIGS. 4 and 5 are flowcharts showing the operation of the first embodiment.

As shown in FIG. 1, a marketing strategy support system of the first embodiment is provided with a server apparatus 100 for AMT (Area Marketing Tool) and a client apparatus 200 for the AMT. Both are connected to each other through a network 400*a*. Also, the server apparatus 100 and input files 300 established within a computer in a selling management department, accounting department or the like of one's own company are connected to each other through a network 400*b*. Here, as a communication method, any one of a wire line, a wireless line, a private line, a general line and the like may be used irrespectively of the kind of network. Only one client apparatus 200 is shown in FIG. 1. Actually, a plurality of client apparatuses 200 can be connected through the network 400a to the server apparatus 100, in order to send the same PPM data.

The server apparatus 100 may be a personal computer having a memory with a relatively large capacity, a middle size computer or a large size computer. On the other hand, the client apparatus 200 may be a personal computer, especially a note type personal computer or a mobile type computer, or a type connected through a portable telephone to the server apparatus 100.

The server apparatus 100 is provided with a memory 103 for storing a batch program, a CPU 101 for executing this batch program, a memory 102 such as RAM or the like for providing a work area to the CPU 101, a large size memory 110 for storing database (AMT D/B group), a modem 120 that can be connected to the network 400a and a reading device 107 such as a CD-ROM drive or the like. A shop attribute information file 111, a sale accumulation information file 112, a prefecture city, ward, town and village master file 113 and a territory sales information file 114 are logically established in this database. Those files respectively store a shop attribute information, a sale information, a prefecture city, ward, town and village master information and a territory sales information which are inputted by a batch process of the client apparatus 200 from the input file 300. Moreover, an in-AMT master file 115 for storing an in-AMT master information, which is data-inputted from a master management menu in the server apparatus 100, and a PPM data file 116 for storing PPM data (later-described PPM parameter Y, PPM parameter X and the like) obtained as a result calculated by the server apparatus 100 are logically established in the database.

Here, the shop attribute information is information indicative of a name of a shop and its shop code, and is given in advance as information peculiar to an individual shop. The sale information refers to information indicative of sale of one's own company's product to each business customer which are totaled, for example, by month and year, and indicates sale for at least one year and two years ago, and it is optionally totaled by the selling management department or the accounting department of one's own company. The prefecture-city, ward, town and village master information is attribute information indicative of a prefecture as well as a city, a town or a village at which each shop is located. The territory sales information is information indicative of sales of a particular product, such as, for example, the entire sales of domestic electrical products in each territory (e.g., a unit of a prefecture as well as a city, a town or a village), and can be typically obtained from the commercial statistics announced every several years (for example, every three or four years) by each local autonomous entity or each public search institution. However, this may be separately investigated.

Also, through the data input from the master management menu, the in-AMT master file 115 includes: flag information which corresponds to each shop attribute information and indicates whether or not each shop is targeted for an analysis; shop sales information (information indicative of gross sales by shop irrespectively of one's own company and another company); average rough profit information in each shop; index data indicative of growth of a territory calculated by the batch process; and previous year comparison data with regard to the sales of one's own company's product. This shop sales information includes at least those on one year and two years ago. Such sales information can be typically obtained from a settlement of accounts announced by a juridical person including each business customer for each settlement term. Or, it may be separately searched or may be directly obtained from each business customer.

Various files stored as the database within the large size memory 110 is maintained by the input process of the input file 300 from the network 400b, the data input process from the master management menu or the batch process of the client apparatus 200 corresponding to them. Especially, the batch process is carried out for accumulating the sale accumulation information in the sale accumulation information file 112 as the sequentially newest component, correspondingly to the thus-inputted sale information.

Moreover, the server apparatus 100 uses the batch process, calculates the PPM data as follows, and maintains the PPM data file 116.

Here, the manner of calculating a PPM parameter Y which implies an index of attractiveness in each shop and a PPM parameter X which implies an index of strength of one's own company's product in each shop is described as the PPM data in the first embodiment.

At first, a shop sale Y1 in an analysis target shop is extracted in accordance with the flag information indicating whether or not it is the analysis target stored in the in-AMT master file 115. This shop sale Y1 is suitably maintained by the server apparatus 100 as mentioned above. The shop targeted for the analysis in this way may include all the shops. However, it is desirable to exclude the shops improper to the analysis in the same dimension, such as a communication sale, a sale in special manner and the like, in advance from the analysis target. This flag information is also maintained by the server apparatus 100.

Next, the territory sales information (for each city, ward, town or village) is obtained which depends on commercial statistics for the previous time and two times ago stored in the territory sales information file 114. On the other hand, an issue interval between the territory sales information for the previous time and the two times ago is obtained. This issue interval is also maintained on the server apparatus 100.

As an index indicative of growth of a total buying power in each territory, the following equation (1) is used to calculate an annual change rate (annual growth rate) Y2 of the gross sales in each territory.

$$Y2 = \text{POWER (Territory Sales for Previous Time/Territory Sales Two Times Ago, 1/Issue Interval)} * 100 \quad (1)$$

wherein, POWER (x,y) denotes the y-th root of x.

In addition, it is supposed that Y2=100 in a case of a data calculation error because of the absence of territory sales information and the like (namely, in this case, it is regarded as zero growth).

Next, the sale information data and the sales for a previous year including recent months are totaled in accordance with the sale information by shop stored in the sales information file 112. After that, a sale X1 in an actually-sold base corresponding to the sale of one's own company's product to each shop is calculated by using the following equation (2).

$$X1 = \text{Sales}/(1 - \text{Rough Profit} \div 100) \quad (2)$$

At this time, the rough profit information is obtained from the in-AMT master file 115 for storing it for each business customer and is used for the calculation. However, the average rough profit may be set for each business customer, each juridical person, each territory and the like. Or, the average rough profit may be collectively set. At this time, a continuation process distribution process is carried out as the occasion demands. Actually, even if a name of a shop or a name of a juridical person is changed or an individual shop is franchised so that there is no continuation between new and old shops, a process of registering on the in-AMT master file 115 is carried out so as to create a continuation between the shops lasting for about one year when the practical continuation is allowed. Or, a process of distributing the sales (achievements) or the apparent sales for each shop is carried out if products are collectively sent to a product center or the like and then they are sold through the product center or the like to each shop.

As an index indicative of the growth of the selling power of one's own company's product in each shop, an annual change rate X2 of the sale X1 is respectively calculated by using the following equation (3).

$$X2=(X1/\text{Previous Year Information Corresponding to } X1)*100 \quad (3)$$

If it exceeds a preset growth maximum limit, it is defined as X2=Growth Maximum Limit. This growth maximum limit is maintained by the server apparatus 100. For example, it is set to a value of 500% or the like.

It is assumed that X2=100 if the corresponding previous year information is not obtained because of the calculation error, (namely, in this case, it is regarded as zero growth).

Next, standard deviations with regard to the shop sale Y1, the annual change rate Y2, the sale X1 and the annual change rate X2 which are extracted by the above-mentioned processes are respectively determined by using the following equations (4).

$$\text{Standard Deviation of } Y1=\{(n^*\Sigma Y1^2-(\Sigma Y1)^2)/n^*(n-1)\}^{1/2}$$

$$\text{Standard Deviation of } Y2=\{(n^*\Sigma Y2^2-(\Sigma Y2)^2)/n^*(n-1)\}^{1/2}$$

$$\text{Standard Deviation of } X1=\{(n^*\Sigma X1^2-(\Sigma X1)^2)/n^*(n-1)\}^{1/2}$$

$$\text{Standard Deviation of } X2=\{(n^*\Sigma X2^2-(\Sigma X2)^2)/n^*(n-1)\}^{1/2} \quad (4)$$

wherein, n denotes the number of samples (the total number of shops targeted for the analysis).

The standard deviations with regard to the shop sale Y1, the annual change rate Y2, the sale X1 and the annual change rate X2 are respectively determined by using the following equations (5).

$$\text{Deviation Value of } Y1=\{(Y1-\text{Average of } Y1)/\text{Standard Deviation of } Y1\}*10+50$$

$$\text{Deviation Value of } Y2=\{(Y2-\text{Average of } Y2)/\text{Standard Deviation of } Y2\}*10+50$$

$$\text{Deviation Value of } X1=\{(X1-\text{Average of } X1)/\text{Standard Deviation of } X1\}*10+50$$

$$\text{Deviation Value of } X2=\{(X2-\text{Average of } X2)/\text{Standard Deviation of } X2\}*10+50 \quad (5)$$

wherein, as for Y1 and Y2, only the city, the town and the village are targeted, and the city having the ward and the rural section are omitted.

Next, the PPM parameter Y indicative of the attractiveness of each shop is calculated as a weighted average of the deviation values Y1 and Y2 by using the following equation (6).

$$Y=\text{Deviation Value of } Y1*\text{Configuration Ratio of } Y1+\text{Deviation Value of } Y2 \text{ Configuration Ratio of } Y2 \quad (6)$$

On the other hand, the PPM parameter X indicative of the strength of one's own company in each shop is calculated as a weighted average of the deviation values X1 and X2 by using the following equation (7).

$$X=\text{Deviation Value of } X1*\text{Configuration Ratio of } X1+\text{Deviation Value of } X2*\text{Configuration Ratio of } X2 \quad (7)$$

Then, those calculated PPM parameters Y and X are stored in the PPM data file 116, correspondingly to each shop.

In addition, the Y1 configuration ratio, the Y2 configuration ratio, the X1 configuration ratio and the X2 configuration ratio are stored in the in-AMT master file 115, and maintained in the server apparatus 100.

In FIG. 1, the client apparatus 200 is provided with a memory 203 for storing a picture plane program, a CPU 201 for executing this picture plane program, a memory 202 such as RAM and the like for providing a work area to the CPU 201, a display 205, a modem 220 that can be connected to the network 400a, an input device 206 including a keyboard and a mouth, and a reading device 207 such as CD-ROM and the like.

In FIG. 1, when the server apparatus 100 receives a request (PPM graph display condition) of requiring the desirable parameter of the PPM parameters Y and X stored in the PPM data file 116 from the modem 220 of the client apparatus 200, by using the modem 120 through the network 400a, the CPU 101 transmits the PPM parameters Y and X corresponding to this request, from the modem 120. In response to this transmission, when it is obtained by the modem 220 on the side of the client apparatus 200, the CPU 201 generates a display data to display a scatter diagram with the PPM parameters Y and X as XY coordinates in accordance with the picture plane program, in the client apparatus 200. The scatter diagram in which the obtained PPM parameters Y and X are plotted on the X-Y coordinates is displayed on the display 205.

Especially in this embodiment, the client apparatus 200 has the input device 206, and is designed such that an operator, such as a salesman or the like, can input the condition data indicative of the condition of specifying that corresponding to the desirable marketing strategy analysis target of the PPM parameters Y and X, through the input device 206. Such an input is suitably carried out by a salesman who tries to analysis a desirable territory (for example, a particular city, town or village as well as a prefecture), a desirable business customer group (for example, a plurality of business customers belonging to the same juridical person), a desirable time (for example, a month or several months immediately before or in a previous particular time) or the like. The thus-input condition data is transmitted from the modem 220 through the network 400a to the side of the server apparatus 100, and received by the modem 120 on the side of the server apparatus 100. Then, the CPU 101 extracts the PPM parameters Y and X meeting the condition represented by the received condition data, from the PPM data file. The extracted PPM parameters Y and X are transmitted from the modem 120 through the network 400a to the client side, and received by the modem 220 on the side of the client apparatus 200. Then, the display 205 displays thereon the scatter diagram corresponding to the received PPM parameters Y and X. Thus, If the side on the client apparatus 200 suitably changes the condition of specifying that corresponding to the desirable marketing strategy analysis target, the scatter diagram with regard to the various territories and times or the business customer group and the product group can be displayed very easily and quickly. Hence, this is very convenient.

FIG. 2 shows an example of the picture plane of the display 205 for displaying thereon the scatter diagram as mentioned above.

In FIG. 2, a scatter diagram 205a is displayed on the upper half of the picture plane, and a list 205b corresponding to points 205p plotted on the scatter diagram 205a is displayed on the lower half of the picture plane.

Thus, when the shop is analyzed by viewing the scatter diagram 205a, an X-axis and a Y-axis have the evident relation with each other. A straight line 205c of Y=X is a balance line between the attractiveness of a shop and the strength of one's own company. For this reason, irrespectively of the magnitude of the attractiveness of a shop (for example, the growth of a territory at which each shop is located, and the magnitude of a selling capacity of each shop or each juridical person) and the magnitude of a strength of one's own company (for example, the growth of one's own company's power in each shop, or the magnitude of a share of one's own company in each shop), if a marketing strategy (plans of a salesmen arrangement, an event, and an investment of other various expenses such as an exhibition and the like) is planned so as to make the plotted points 205p closer to the balance line 205a, it is possible to plan the most efficient marketing strategy. More actually, if the respective plotted points 205p are closer to the side of the X-axis than the balance line 205a, namely, as for a shop plotted at a point 205p at which the PPM parameter X is greater than the PPM parameter Y, one's own company's product can be judged to be sufficiently sold in the shop where it may not be sold relatively. On the contrary, if they are closer to the side of the Y-axis than the balance line 205c, namely, as for a shop plotted at a point 205p at which the PPM parameter X is lower than the PPM parameter Y, one's own company's product can be judged to be not sufficiently sold in the shop where it may be sold relatively. Moreover, if the point 205p is located on or near the balance line 205c, namely, as for a shop plotted at the point 205p in which the PPM parameters Y and X are substantially equal to each other, one's own company's product can be judged to be relatively sold by the number corresponding to the selling power of the shop.

Thus, for example, when assigning the limited business resource (the salesmen, the times, the business expenses and the like) to a plurality of shops, if decreasing the business power from the existing power for the shops plotted on the side closer to the X-axis than the balance line 205c, increasing the business power from the existing power for the shop plotted on the side closer to the Y-axis than the balance line 205c, and applying the business power in its original state to the shops plotted in the vicinity of the balance line 205c, it is possible to use a constant business power and then expand the sale the most effectively by reducing the relatively excessive business power and then strengthening the deficient business power. According to the experiment of the inventor et al., such marketing strategy enables the plotted point 205p of the shop, in which the business power is strengthened, to be made closer to the balance line 205c right along the X-axis, and enables the plotted point 205p of the shop, in which the business power is reduced, to be made closer to the balance line 205c left along the X-axis, and enables the many points 205p on the scatter diagram to be entirely concentrated in the vicinity of the balance line 205c.

So, such concentration can lead to the judgment that the marketing strategy with regard to the corresponding shop group can be planned very effectively.

As shown in FIG. 2, it is desirable to indicate the scatter diagram in which such a balance line 205c is superimposed on the respective plotted points.

In this embodiment, it is especially desirable to indicate the scatter diagram 205a with scales which respectively correspond to the maximum values and the minimum values of the received parameters Y and X. Accordingly, the operator of the client apparatus 200 can automatically view the easily visible scatter diagram without the necessity of a work of setting the scales. Moreover, it is desirable that the indication range of the scatter diagram 205a can be specified by the input device 206 (actually, for example, a range specification and a determination operation through a cursor movement using a mouth). Accordingly, the operator can view a desired portion in the scatter diagram 205a by expanding it. Especially, it is convenient to specify and expand a part of the scatter diagram 205a automatically scaled so as to view the entire portion by once using a default scale This embodiment is designed especially as follows. That is, in response to the condition data (the data to specify a desirable territory, a desirable business customer, a desirable time or the like) inputted through the input device 206 in the client apparatus 200, the server apparatus 100 transmits the shop sales information, the territory sales information and the sale information in the time and the shop which correspond to this condition data and the like together with the PPM parameters Y and X. The client side 200 indicates the received information together with a name of a shop in a predetermined format. For example, as shown in FIG. 2, it is indicated in the form of the list 205b below the scatter diagram 205a.

Thus, the operator, such as the salesman and the like, can view those information simultaneously to the scatter diagram 205a. Hence, the operability is very excellent in planning the marketing strategy. In addition, the predetermined format may include, for example, a time series indication which indicates various information in a desirable time in turn, a table list and the like.

In addition, if the points 205p plotted on the scatter diagram 205a are specified by the input device 206, a name of a shop corresponding to the specified point 205p, its shop sales information and the like may be highlighted on the list 205b or listed up. Accordingly, this is convenient since it is possible to instantly grasp the corresponding relation between the scatter diagram 205a, the name of the corresponding business customer, its sales information and the like.

Moreover, it may be designed so as to specify any one point 205p or a plurality of points 205p plotted on the scatter diagram 205a shown in FIG. 2 by using the input device 206, and in accordance with a map data separately stored in the memory 202, the reading device 205 or the like, display a map in which a predetermined mark overlaps with a position of a business customer corresponding to the specified point 205p, on the display 205. Such configuration enables the operator, such as the salesman and the like, to view the map simultaneously to the scatter diagram or before or after viewing it. Thus, this is very convenient in planning the marketing strategy in relation to geographical condition.

If the respective points plotted on the scatter diagram 205a indicated as mentioned above are closer to the side of the X-axis than the balance line 205c, this implies an index indicative of a victory of one's own company in the business with regard to the corresponding shop. On the contrary, if they are closer to the side of the Y-axis than the balance line 205c, this implies an index indicative of a defeat of one's own company in the business with regard to the corresponding shop (moreover, if they are located on the balance line 205c or in the vicinity of it, this may imply an index indicative of a drawn game of one's own company in the business with regard to the corresponding shop). Thus, the data indicative of the victory or the defeat (moreover, the drawn game) is preferably prepared in a proper period (for example, for each month, each settlement term, each year and the like) for each shop, and then it is displayed together with other information as a victory or defeat 205e which is a predetermined item in the list 205b on the lower half of FIG. 2. This is valuable in usage worth as the data to indicate the situation of the business service in each shop in extremely frank visual manner (for example, symbols such as ○ (victory), ● (defeat) and the like).

Moreover, as shown in FIG. 3, it may be designed such that the result in which such victory or defeat is judged for each month with regard to each shop is indicated as a list table for each shop (for example, by using the symbols such as ○ (victory), ● (defeat) and the like) as a part or whole of another displayed picture plane of the display 205. If viewing a table 205f shown in FIG. 3, it is very easy to understand the time series flow of the objective victory or defeat judged in accordance with the PPM parameters Y and X, which may be convenient for planning the marketing strategy.

Moreover in this embodiment, when the parameter Y is calculated, the configuration ratio in its weighted average can be set and changed to suitably indicate a scatter diagram when a selling power in each shop is emphasized and a scatter diagram when a growth in each shop is emphasized. Also when the parameter X is calculated, the configuration ratio in its weighted average can be set and changed to suitably indicate a scatter diagram when a selling power of one's own company in each shop is emphasized and a scatter diagram when a growth of one's own company in each shop is emphasized. For example, if the configuration ratio of the growth rate is set to 0 as an extreme example, it is possible to indicate a scatter diagram in the selling power in each shop and the selling power in one's own company. On the contrary, if the configuration ratio of the growth rate is set to 1, it is possible to indicate a scatter diagram in the growth ratio in each shop and the growth ratio in one's own company. Such configuration ratios may be integrally set by the server apparatus 100, or may be individually set by each client apparatus 200.

Also, the PPM parameters Y and X are calculated on the side of the server apparatus 100. So it is enough that the side of the client apparatus 200 receives the calculated PPM parameters Y and X through the network 400a, and indicates the scatter diagram 205a by using an editor or browser function attained by the picture plane program on the basis of them. This enables a load on each client apparatus 100 to be very small and also enables the scatter diagram 205a to be quickly displayed in the client apparatus 200 through the network 400a. In addition, the PPM parameters Y and X once calculated on the side of the server apparatus 100 can be shared by a plurality of client apparatuses 200 to effectively use the hardware resource in the whole system. Moreover, this is very advantage in practical usage since the client apparatus 200 can plan the objective marketing strategy based on the same judgment standard. Especially, a centralized process can be carried out on the side of the server apparatus 100 after the optional input of the sale information and the like from the input file 300 which is the same information source. Also, this process result can be used by the plurality of client apparatuses 200. Hence, correspondence when information is updated in real time becomes very easy, which may reduce the possibility of the trouble resulting from the mixture of new data and old data, the indication of the scatter diagram 205a different for each client apparatus 200 and the like.

In addition, the present invention determines the deviation values with regard to not only the sale (wholesale value) of one's own company's product to each shop but also the sale X1 in an actually sold base and the annual change rate (annual rate) X2 of the sale X1 in the actually sold base. Thus, it can be compared on the same dimension with the deviation values with regard to the growth rate of the total sales in each territory and the sale Y1 of each shop which are originally in the actually sold base. Hence, the relation and linkage on the scatter diagram 205a between the PPM parameters Y and X are very accurate as shown in FIG. 2.

In the above-mentioned first embodiment, the sale Y1 with regard to all the products (for example, all domestic electrical products) by shop is employed as the input data to calculate the PPM parameters Y and X. However, instead of the sale Y1 of all the products, a sale Y1' with regard to a particular product group (for example, only AV (Audio Visual) products, and further, only audio products) in each shop may be used as an input data, so that the PPM parameters Y and X are calculated similarly.

In this case, actually at a former stage of calculating the deviation value of the sale Y1, the sale Y1' for each shop of the particular product group is determined as following.

$$Y1'=\text{Sale}Y1 \text{ for Each Shop} \times \text{Ratio}$$

Then, it may be used instead of the Y1. This ratio implies, for example, a ratio of a particular product to all the products in each shop. This numeral is also determined from a settlement report and the like, similarly to the sale Y1, and maintained by the server apparatus 100. Thus, the display 205 in the client apparatus 200 can display thereon the scatter diagram to which the particular product group targeted for the business by one's own company is further reflected.

Both of the PPM parameters Y and X calculated by using such a sale Y1' and the PPM parameters Y and X calculated by using the above-mentioned sale Y1 may be used as the PPM data and stored in the PPM data file 116. Then, if it is designed so as to transmit any one or both of the PPM parameters Y together with the PPM parameter X, in response to the request from the client apparatus 200, it is possible to view a scatter diagram generated as the result of the usage of both the sales Y1 and Y1'. Thus, this is further convenient.

The flow of the operations in this embodiment will be described below with reference to flowcharts in FIGS. 4 and 5.

In FIG. 4, the shop attribute information and the like are firstly received through the network 400b from the input file 300 (Step S1), and are written to the database in the large size memory 110 of the server apparatus 100 (Step S2). Here, the server apparatus 100 once judges whether or not the receiving process is correctly carried out (Step S3). If it is not correctly carried out (Step S3; NO), the operational flow returns back to the step Si, and the process at the step SI is again tried. If it is correctly carried out (Step S3; YES), the sale information is stored as the sale accumulation information in the sale accumulation file 112 (Step S4).

Next, the batch process in the CPU 101 totals a sale for a recent year to thereby determine a sale X1 (Step S11), totals a sale for a previous year to thereby determine an annual change rate X2 of sale (Step S12), totals a shop sale Y1 (Step S13), and totals a territory sale to thereby determine an annual change rate Y2 (Step S14). Then, in accordance with those numeral data, an X-coordinate and a Y-coordinate of each shop are calculated from the above-mentioned statistic calculation (Step S15). The calculated X-coordinate and Y-coordinate are correlated to each shop, and stored in the PPM data file 116 (Step S16). Moreover, the PPM data group which may be frequently used or extracted in response to the request from the client apparatus 200 is edited such that it can be extracted in advance at one set (Step S17). Here, the server apparatus 100 once judges whether or not processes after the receiving process are correctly carried out (Step S18). If they are not correctly carried out (Step S18; NO), the operational flow returns back to the step S4, and the process at the step S4 is again tried. If they are correctly carried out (Step S18; YES), the batch process to preparing the PPM data is ended.

The processes at the steps S1 to S18 are carried out by the server apparatus 100.

Next, in the client apparatus 200, processes to display the scatter diagram are carried out at steps after the step S18.

At first, a menu picture plane in the client apparatus 200 is actuated (Step S21). A condition set picture plane is displayed to carry out a condition set input of a desirable scatter diagram to be displayed through the input device 206 (Step S22). Here, the CPU 201 judges whether or not there is an error in the input condition (Step S23). If there is the error (Step S23; NO), the operational flow returns back to the step S22, and the process at the step S22 is again tried. If it is correctly carried out (Step S23; YES), the operational flow proceeds to a step S24.

Next, the PPM data corresponding to the condition data indicative of the set condition and the like are obtained through the network 400*a* from the side of the server apparatus 100 (Step S24). The obtained information is edited such that it can be instantly displayed in various formats (Step S25). The maximum values and the minimum values of the obtained PPM parameters Y and X are respectively determined (Step S26), and a graph scale in the scatter diagram to be displayed is set (Step S27). Then, the edited PPM parameters Y and X and the set scale are used to determine positions at which (X,Y) coordinates of the respective shops are plotted (Step S28). Accordingly, a scatter diagram (PPM graph) such as the scatter diagram 205*a* shown in FIG. 2 is displayed (Step S29).

Next, an event occurrence through the input device 206 is monitored in the condition that the scatter diagram is displayed (Step S30).

If the event occurs (Step S30; YES), it is firstly judged whether or not the event is an end event to end the display of the scatter diagram (Step S31). Here, if it is the end event (Step S31; YES), a series of display processes is ended. If it is not the end event (Step S31; NO), it is judged whether or not the event is a previous month display event to display a scatter diagram based on the sale of a previous month, with respect to a sale month corresponding to the scatter diagram currently being displayed (Step S32). Here, if it is the previous month display event (Step S32; YES), a previous month information is obtained through the network 400*a* from the server apparatus 100 (Step S33). The maximum values and the minimum values of the obtained PPM parameters Y and X are respectively determined (Step S34) to set a graph scale in the scatter diagram to be displayed (Step S35). Then, the edited PPM parameters Y and X and the set scale are used to determine positions at which (X,Y) coordinates of the respective shops are plotted (Step S36). The operational flow returns back to the step S29. The scatter diagram in relation to the previous month is displayed.

On the other hand, if it is not the previous month display event at the step S32 (Step S; YES), it is judged whether or not the event is a next month display event to display a scatter diagram based on the sale of a next month, with respect to the sale month corresponding to the scatter diagram currently being displayed (Step S37). Here, if it is the next month display event (Step S37; YES), a next month information is obtained through the network 400*a* from the server apparatus 100 (Step S38). The operational flow returns back to the step S29 through the steps S34 to S36. The scatter diagram in relation to the next month is displayed.

On the other hand, if the event is not the next month display event at the step S37 (Step S37; NO), it is judged whether or not the event is a click event to the plot point on the scatter diagram (Step S39). Here, the click event at the plot point implies that a plot point located in a particular range or at a particular position on the scatter diagram is specified by a mouth click operation through a cursor movement. Here, if the event is the click event (Step S39; YES), an error parameter is obtained which indicates an error at a click position on a preset picture plane (Step S40). A shop is extracted which corresponds to a plot point belonging to a range in which the error parameter is added to a click coordinate (Step S41). The operational flow returns back to the step S29 through the steps S34 to S36. The scatter diagram in relation to the extracted shop is displayed.

On the other hand, if the event is not the click event at the step S39 (Step S39; NO), it is judged whether or not the event is a size change event to change a size of a scatter diagram (Step S42). If it is the size change event (Step S42; YES), the operational flow returns back to the step S29 through the steps S35 and S36. The scatter diagram is displayed in the changed size. On the other hand, if it is not the size change event (Step S42; NO), the operational flow returns back to the step S30. The scatter diagram is displayed.

The above-mentioned operations on the side of the server apparatus 100 are executed by the CPU 101, after the reading device 107 installs a computer program stored in a record medium 107*a*, such as, for example, CD-ROM and the like, in the server apparatus 100. The operations on the side of the client apparatus 200 are executed by the CPU 201, after the reading device 207 installs a computer program stored in a record medium 207*a*, such as, for example, CD-ROM and the like, in the client apparatus 200. However, such computer programs can be read by one of the server apparatus 100 and the client apparatus and then downloaded to the other apparatus. Moreover, they can be downloaded through a network such as an internet or the like from another system. Also, the record mediums 107*a*, 207*a* are not limited to the CD-ROM. If they are the well known record medium, such as DVD-ROM, a magneto-optical disc, a floppy disc or the like, its kind does not matter.

The example in which the shop is set as the business customer is described in the first embodiment. However, it may be designed so as to set a shop group based on a juridical person or a predetermined classification as a business customer and then input an input file in a gross value and further output a scatter diagram. Such configuration enables, for example, the display of a juridical person unit in which the analyses are totaled at a shop unit, or enables the analysis in a form of juridical person comparison. Or, as for a time unit serving as a standard of a sale or the like, it is not limited to a monthly unit or a yearly unit. It may be designed so as to perform the analysis for a plurality of months on the same shop. Such configuration enables the change in time series to be easily grasped at a time unit corresponding to an attribute of a product.

As detailed above, according to the first embodiment, the condition set of organization attribute and the like enables the extraction result to be easily displayed. Also, it is possible to draw the balance line (target set line) of connecting the upper right portion to the lower left portion of the scatter diagram. Moreover, the values of the X-axis and the Y-axis are equal to each other at the points (shops) plotted on the balance line. Thus, it is possible to evidently determine the victory or defeat for each shop and set the target. Furthermore, the scatter diagram and the list table can be displayed on the same picture plane to thereby correlate the points plotted on the scatter diagram to the shops on the list table and also extract the shops from the scatter diagram. Especially, the establishment of open environment and system, in which data can be optionally inputted, enables the timely result indication (the indication of the analysis result and the target set based on the indication result).

Moreover, this is convenient since the extraction range (value) can be freely selected in extracting the shops on the scatter diagram and further the desirable portion to be analyzed can be extracted as necessary. On the other hand, it is possible to expand shrink the range displayed on the scatter diagram, and also easy to carry out a partial analysis through the expansion if the plotted points are dense.

Furthermore, when the extracted picture plane is the newest month, if it is designed to trace back at a monthly unit until the same month of a previous year in a range of the same condition set, or even when the extracted picture plane is not the newest month, if it is designed to trace back at the monthly unit until the same month of the previous year, with respect to the month, in the range of the same condition set, it is possible to analyze while changing the picture plane at the monthly unit, namely, carry out the time series analysis.

Second Embodiment

Figure 6:
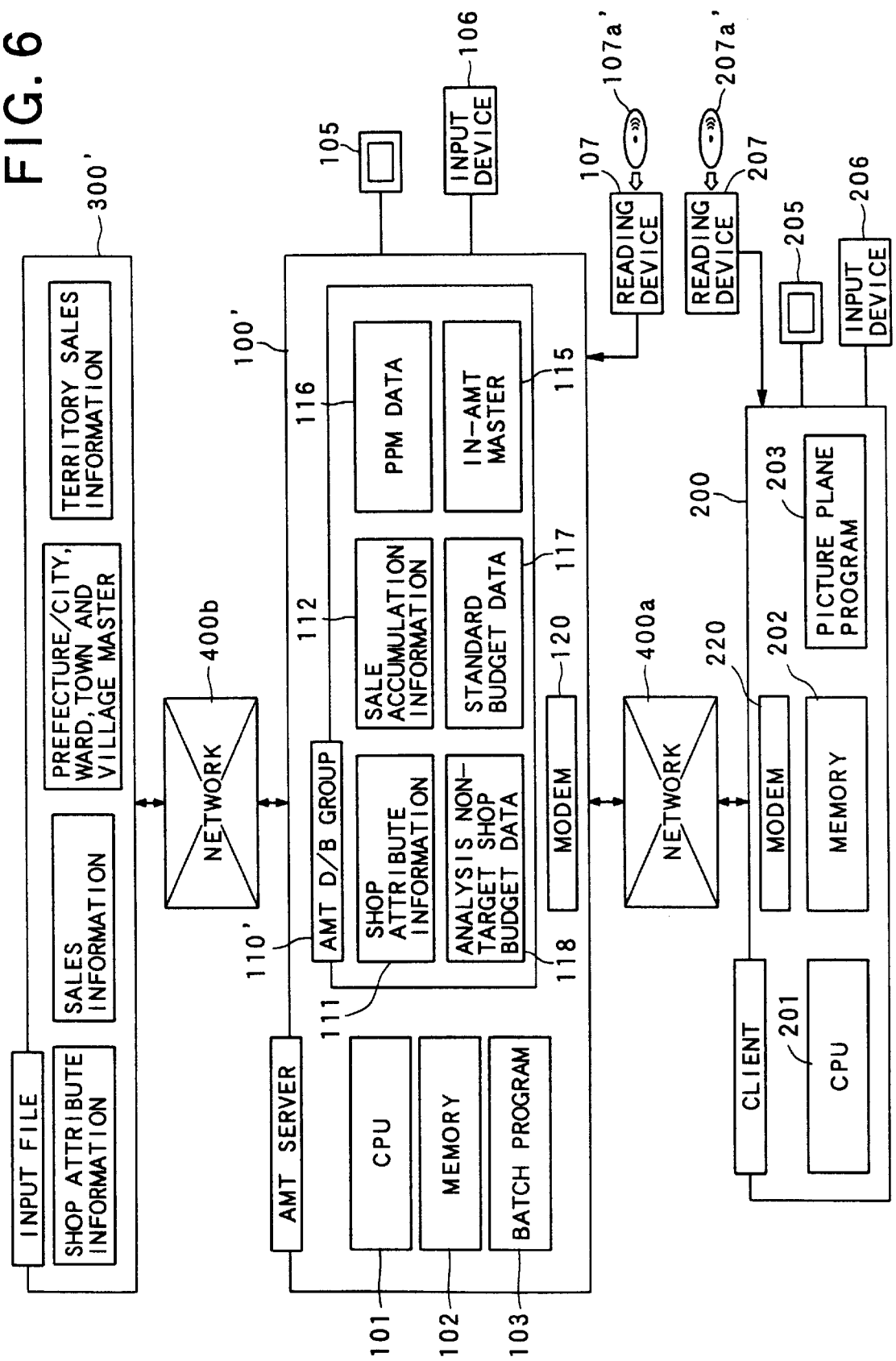
FIG. 6 is a block diagram showing a whole configuration of a marketing strategy support system of a second embodiment in the present invention.
Figure 7:
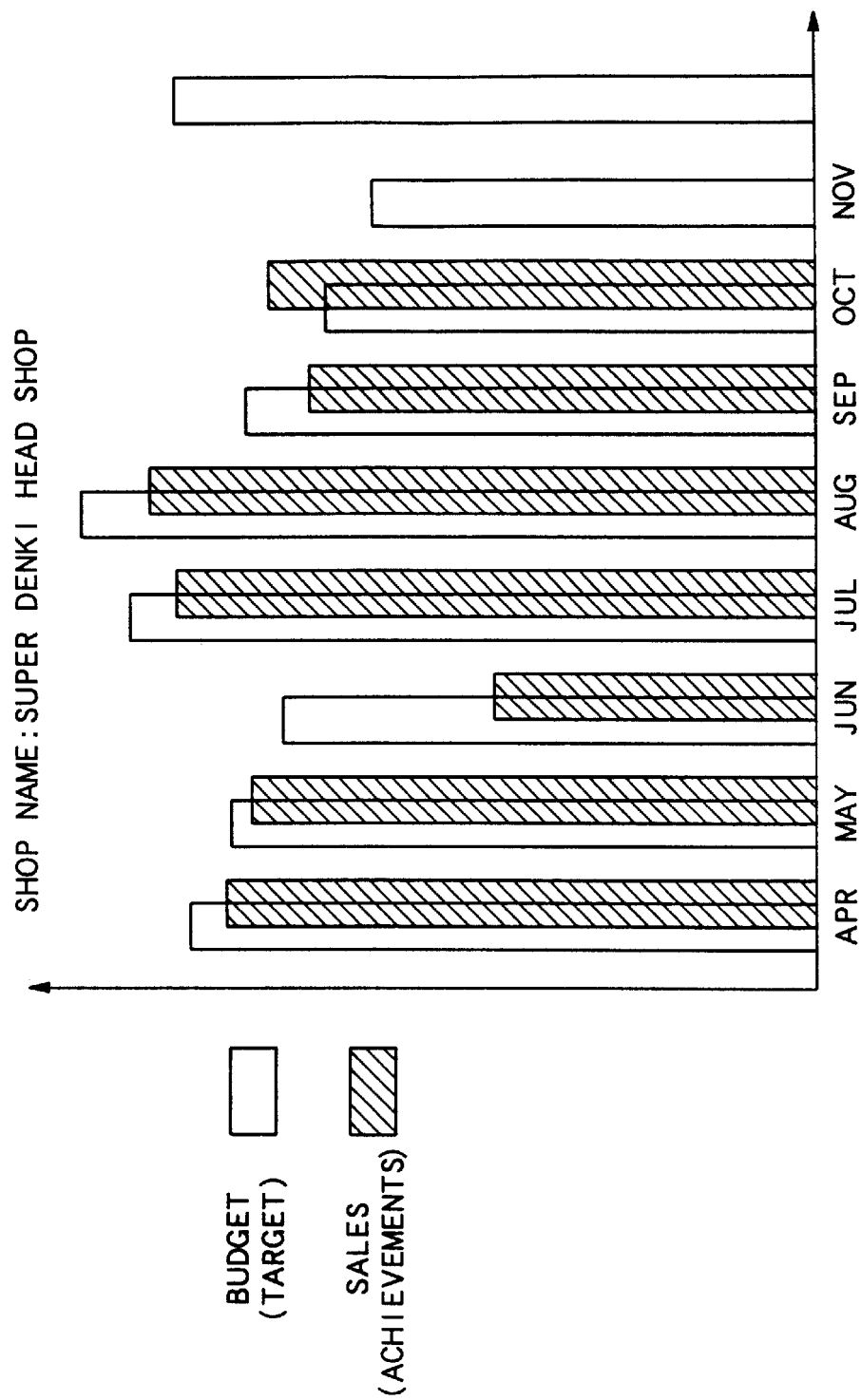
FIG. 7 is a plan view showing an example of a picture plane displayed on a display of the second embodiment.
Figure 8:
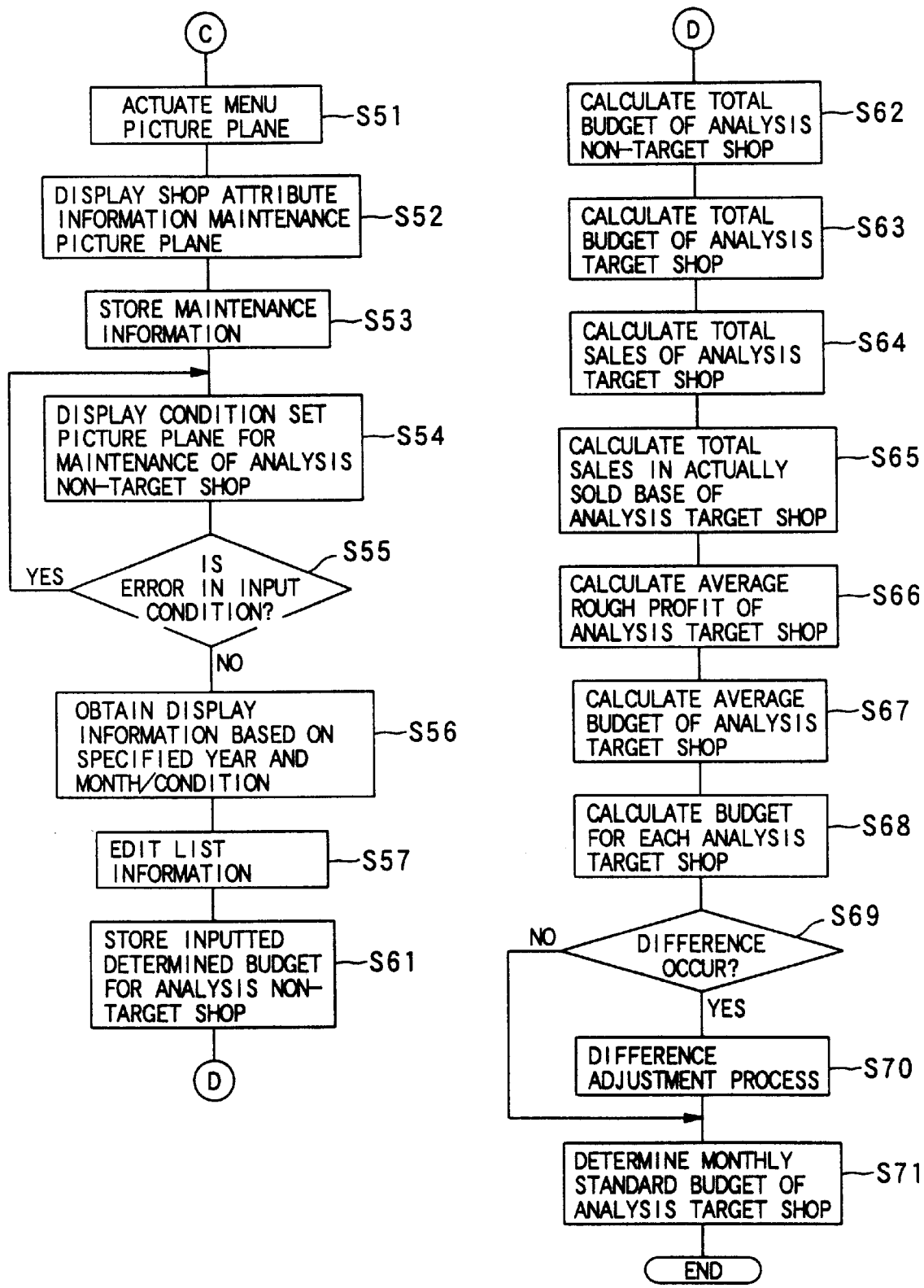
FIG. 8 is a flowchart showing an operation of the second embodiment.

A second embodiment is described with reference to FIGS. 6 to 8. FIG. 6 is a block diagram showing the system configuration of the second embodiment. FIG. 7 is a plan view showing an example of a picture plane that can be displayed in the second embodiment. And, FIG. 8 is a flowchart showing the operations of the second embodiment. In the second embodiment shown in FIG. 6, the same reference symbols are given to the components equal to those of the first embodiment, and the explanations are omitted.

As shown in FIG. 6, a marketing strategy support system of the second embodiment is provided with a server apparatus 100' and a client apparatus 200. Both are connected to each other through a network 400a. Also, a server apparatus 100 and input files 300' established within computers in a selling management department and an accounting department of one's own company are connected to each other through a network 400b. Only one client apparatus 200 is shown in FIG. 6. Actually, a plurality of client apparatuses 200 can be connected through a network 400a to the server apparatus 100', in order to send the same PPM data.

The server apparatus 100' may be a personal computer having a memory with a relatively large capacity, a middle size computer or a large size computer.

The server apparatus 100' is provided with a memory 103, a CPU 101, a memory 102, a large size memory 110' for storing database (AMT D/B group), a modem 120 and a reading device 107. A shop attribute information file 111, a sale accumulation information file 112, an in-AMT master file 115 and a PPM data file 116 are logically established in this database. Moreover, a standard budget data file 117 for respectively storing a standard budget data indicative of a budget for each month by each shop which is targeted for analysis and obtained as a later-described calculation result and a budget data in an analysis non-target shop, and an analysis nontarget shop budget data file 118 are logically established in the database.

A budget distribution process will be described below for calculating the standard budget data indicative of the budget for each month by each shop in the second embodiment.

At first, a shop sale Y1 in an analysis target shop is extracted in accordance with a flag information indicating whether or not it is the analysis target stored in the in-AMT master file 115. This shop sale Y1 is suitably maintained by the server apparatus 100, as mentioned above. The shop targeted for the analysis in this way may include all the shops. However, it is desirable to exclude the shops improper to the analysis in the same dimension, such as the communication sale, the sale in special manner and the like, in advance from the analysis target. This flag information is also maintained by the server apparatus 100.

Next, a display 105 and an input apparatus 106 mounted in the server apparatus 100' or a display 205 and an input device 206 mounted in the client apparatus 200 are used to receive a master budget data indicative of a master budget which implies a yearly sale target of one's own company and a monthly configuration data indicative of a monthly configuration ratio of the yearly sale target. Similarly, an analysis non-target shop set previous ratio is received. In addition, it is desirable to set this analysis non-target shop set previous ratio by considering the expansion of the master budget.

Next, a batch process is carried out for sequentially accumulating the sale accumulation information as the newest information, in the sale accumulation information file 112, in accordance with the input of the sale information from the input file 300'.

Next, a client process is carried out for determining an analysis non-target shop budget, through the input apparatus 106 mounted in the server apparatus 100' or the input device 206 mounted in the client apparatus 200. This determination process is usually carried out by a salesman in charge of each shop.

Next, a total of budgets of the analysis non-target shops determined by the client process is calculated to further calculate an amount corresponding to an analysis non-target shop within the master budget by using the following equation (8) from the totals of the budgets of the analysis non-target shops and the abovementioned master budget.

Master Budget−Total of Budget of Analysis Non−Target Shop (8)

Next, a budget (total amount) in an actually sold base in the analysis target shop is calculated through the following ① to ⑥ procedures.
① At first, a total of sale achievements is calculated (a total of analysis target shops corresponding to past twelve months including a previous month).
② Next, a total of actually sold sale achievements is calculated by using the following equation (9).

Total Calculated by ①=Rough Profit (9)

(wherein the rough profit is maintained by the server apparatus 100', as mentioned above).

③ An average rough profit is calculated by using the following equation (10).

(Value Obtained by Equation (9)–Total Calculated By (①))÷Value Obtained by Equation (9)    (10)

④ A budget of actually sold base is determined by using the following equation (11).

(Master Budget–Total of Budget of Analysis Non–Target Shop)÷(1–(Value Obtained by Equation (10))    (11)

⑤ An average budget is calculated by using the following equation (12).

Value Obtained by Equation (11)÷Total Number of Analysis Target Shop    (12)

⑥ An entire standard deviation is calculated by using the following equation (13).

Average Budget (Value Obtained by Equation (12)÷Average of Domestic Electrical Product Sales×Standard Deviation of Domestic Electrical products sale    (13)

(wherein the domestic electrical product sales are maintained by the server apparatus 100', as mentioned above).

Next, the budget in the actually sold base in the analysis target shop calculated through the procedures ① to ⑥ is distributed as a budget by shop in the actually sold base to each business customer, by using the PPM parameter Y which is calculated similarly to the first embodiment, maintained by the batch process in the PPM data file 116 and indicates an index of a business customer attractiveness. That is, the budget in the actually sold base in each analysis target shop is calculated by the following equation (14).

(*PPM* Parameter Y–50)÷10×Entire Standard Deviation (Value Obtained by Equation (13))+Average Budget (Value Obtained by Equation (12)    (14)

Next, the distributed budget by shop in the actually sold base is converted into a budget in a sale base for each shop by using the following equation (15).

Budget of Actually Sold Base by Analysis Target Shop (Value Obtained by Equation (14))×(100–Rough Profit by Shop)÷100    (15)

In addition, such conversion between the actually sold base and the sale base is carried out by the actual rough profit information for each shop. However, it may be done by setting the average rough profit for each business customer, each juridical person, each territory and the like. Or, it may be done by setting a collectively average rough profit.

Next, a difference between the master budget before the distribution and the total of the budget by shop after the distribution is calculated by using the following equation (16).

Master Budget of Analysis Target Shop (Value Obtained by Equation (8))–Total of Budget by Analysis Target Shop    (16)

Then, this difference is assigned at a ratio of the budget by analysis target shop (the value calculated by the equation (15)) to the total of the budgets by analysis target shops.

Next, the thus-calculated budget by shop is assigned for each month and for each shop, in accordance with the monthly configuration ratio which is inputted and maintained as mentioned above. For example, it may be assigned in accordance with the monthly configuration ratio in a certain term (for each half term).

Finally, a batch process is carried out for clearing the budget to the analysis non-target shop.

The standard budget data indicative of the budget for each shop assigned for each month as mentioned above is correlated to each shop and stored in the standard budget data file 117.

In FIG. 6, the server apparatus 100', when receiving a request (PPM graph display condition) from a modem 220 of the client apparatus 200 by using a modem 120 through the network 400*a*, transmits that corresponding to this request in the standard budget data stored in the standard budget data file 117, from the modem 120. In response to this transmission, when it is obtained by the modem 220 on the side of the client apparatus 200, the CPU 201 generates a display data to display the standard budget data in a predetermined format in accordance with a picture plane program, in the client apparatus 200. The thus-obtained standard budget data is displayed in the predetermined format on the display 205.

Especially in this embodiment, the client apparatus 200 has the input device 206, and is designed such that an operator, such as a salesman or the like, can input the condition data indicative of the condition of specifying that corresponding to the desirable marketing strategy analysis target of the standard budget data, through the input device 206. Such an input is suitably carried out by a salesman who tries to analysis a desirable territory (for example, a particular city, town or village as well as a prefecture), a desirable business customer group (for example, a plurality of business customers belonging to the same juridical person), a desirable time (for example, a month or several months immediately before or in a previous particular time) or the like. The thus-input condition data is transmitted from the modem 220 through the network 400*a* to the side of the server apparatus 100, and received by the modem 120 on the side of the server apparatus 100. The CPU 101 extracts the standard budget data meeting the condition represented by the received condition data, from the standard budget data file 117. This extracted budget standard data is transmitted from the modem 120 through the network 400*a* to the client side, and received by the modem 220 on the side of the client apparatus 200. The display 205 displays thereon this received standard budget data in a predetermined format. Thus, If the side on the client apparatus 200 suitably changes the condition of specifying that corresponding to the desirable marketing strategy analysis target, the standard budget data with regard to the various territories and times or the business customer group and the product group can be displayed very easily and quickly. Hence, this is very convenient.

FIG. 7 shows an example of the picture plane of the display 205 for displaying thereon the standard budget data as mentioned above.

In FIG. 7, the standard budget data is indicated as a part of a bar graph in which a monthly standard budget (target) for one shop overlaps with monthly sales (achievements). In this way, the calculated budget amount and the achievement amount are simultaneously displayed to thereby make the budget management easier. In addition, the predetermined format to indicate the standard budget data may include various account books and tables in addition to such a bar graph.

Thus, the budget by each shop can be determined objectively and automatically in accordance with the magnitude of the attractiveness of a shop (for example, the growth of a territory at which each shop is located, and the magnitude of a selling capacity of each shop or each juridical person). For this reason, the most effective marketing strategy can be planned if a marketing strategy (the plans of the salesmen arrangement, the event, and the investment of other various expenses such as an exhibition and the like) is planned in accordance with the budget by shop and by month determined from this embodiment. Also, when the PPM parameter Y is calculated, the configuration ratio in its weighted average can be set and changed to suitably indicate a standard budget when a selling power in each shop is emphasized and a standard budget when a growth in each shop is emphasized. Also, even when the master budget is changed in the middle of a settlement term (downward or upward modification), the individual standard budget can be easily re-determined. Moreover, the standard budget data is calculated on the side of the server apparatus 100'. Then, the side of the client apparatus 200 receives the calculated standard budget data. So, it is enough to indicate the standard budget data by shop and by month in a predetermined format by using the editor or browser function. This enables a load on each client apparatus 200 to be very small, and also enables a plurality of client apparatuses 200 to plan the objective fair marketing strategy based on the same judgment standard. Especially, a centralized process can be carried out on the side of the server apparatus 100' after the optional input of the sale information and the like from the same information source.

In the second embodiment, the budget distribution to each business customer through the PPM parameter Y is carried out in the actually sold base and not in the sale (wholesale value) base. Thus, the distribution process is possible in the same dimension as the deviation values a, b with regard to the total sales of each territory and the sale Y1 of each business customer which are originally in the actually sold base.

As mentioned above, especially in the second embodiment, the master budget is distributed as the budget for each business customer, to one or more business customers which are not targeted for the analysis, among all the business customers. That is, the business customer improper to the analysis in the same dimension, such as the communication sale, the sale of special manner and the like, is excluded from the analysis target. A manual type of distribution process based on achievement data is performed on the business customer which is not targeted for the analysis, through the input apparatus 106 or 107. Thus, the budget distribution can be made further accurate.

In the above-mentioned second embodiment, the sale Y1 with regard to all the products (for example, all the domestic electrical products) by shop is employed as the input data to calculate the PPM parameter Y. However, similarly to the first embodiment, instead of the sale Y1 of all the products, the sale Y1' with regard to the particular product group (for example, only the AV (Audio Visual) products, and further, only the audio products) in each shop may be used as the input data. Hereafter, the standard budget for each month by shop may be calculated similarly.

The flow of the operations in this embodiment will be described below with reference to the flowcharts in FIGS. 4 and 8.

In the second embodiment, the processes at the steps S1 to S18 shown in FIG. 4 are firstly carried out similarly to the first embodiment.

As shown in FIG. 8, a menu picture plane in the display 105 of the server apparatus 100' or the display 205 of the client apparatus 200 is actuated (Step S51) to display a shop attribute information maintenance picture plane (Step S52). An maintenance information inputted through the input apparatus 106 of the server apparatus 100' or the input device 206 of the client apparatus 200 is stored in the shop attribute information file 111 (Step S53).

Next, a maintenance condition set picture plane with regard to the analysis non-target shop is displayed (Step S54) to judge whether or not there is an error in an input condition (Step S55). Here, if there is the error (Step S55; NO), the operational flow returns back to the step S54, and the process at the step S54 is again tried. If there is not the error (Step S55; YES), the operational flow proceeds to a step S56. Then, an display information corresponding to a condition data indicative of a set condition and the like are obtained (Step S56) to edit the obtained information such that it can be instantly displayed in various formats (Step S57).

The processes at the steps S51 to S57 may be carried out from the side of the client apparatus 200 through the network 400a, or may be done on the side of the server apparatus 100'.

The server apparatus 100' stores the determined budget of the analysis non-target shop which is inputted and determined through the above-mentioned input actions (Step S61).

Next, the batch process in the CPU 110 calculates a total of budgets of the analysis non-target shops (Step S62), calculates a total of budgets of the analysis target shops (Step S63), calculates a total sale of the analysis target shops (Step S64), calculates a total sale in the actually sold base of the analysis target shops by using the equation (9) (Step S65), calculates an average profit of the analysis target shops by using the equation (10) (Step S66), calculates an average budget of the analysis target shops by using the equation (12) and the like (Step S67), and calculates a budget by shop of the analysis target shops by using the equation (14) and the like (Step S68).

In succession, a difference resulting from the equation (16) is calculated to judge the presence or absence of the difference (Step S69). If there is the difference (Step S69; YES), after the difference is adjusted (Step S70), the operational flow proceeds to a step S71. If there is not the difference (Step S69; NO), the operational flow proceeds to the step S71 in its original state. At the step S71, a standard budget by month and by shop of the analysis target shop is determined and stored in the standard budget data file 117 (Step S71).

The above-mentioned operations on the side of the server apparatus 100 are executed by the CPU 101, after the reading device 107 installs the computer program stored in the record medium 107a, such as, for example, CD-ROM and the like, in the server apparatus 100. The operations on the side of the client apparatus 200 are executed by the CPU 201, after the reading device 207 installs the computer program stored in the record medium 207a, such as, for example, CD-ROM and the like, in the client apparatus 200. However, such computer programs can be read by one of the server apparatus 100 and the client apparatus and then downloaded to the other apparatus. Moreover, they can be downloaded through the network from another system. Also, the record mediums 107a, 207a are not limited to the CD-ROM. If they are the well known record medium, such as DVD-ROM, a magneto-optical disc, a floppy disc or the like, its kind does not matter.

As detailed above, according to the second embodiment, the shop budget which implies a final unit of the budget distribution is integrally calculated. Accordingly, the time required to calculate the budget is largely reduced as compared with the case that the distribution work is carried out in a plurality of departments. Also, the calculation of the budget by shop enables the budget of the organization or the juridical person to be freely re-arranged in accordance with the condition set with regard to the calculation. Moreover, the usage of the value of the PPM parameter Y (the degree of shop attractiveness) enables the budget to be distributed in accordance with the objective data. Especially, the establishment of the open environment and system, in which data can be optionally inputted, enables the budget calculation using the timely data. Furthermore, the picture plane and the account book which are optimal for the management (budget management) of the distributed standard budget and the achievement progress are provided to thereby enable the provision of the standardized budget and achievement management and the fair evaluation standard.

The marketing strategy support system of the present invention is not limited to the above-mentioned embodiments. It may be suitably changed in the range without departing from the spirit and scope of the invention understood from the whole of this specification. The marketing strategy support system involving such modification is also included in the technical field of the present invention.

As detailed above, according to the marketing strategy support system of the present invention, the objective and quantitative marketing strategy indexes are provided which are useful for the marketing strategy. Also, the marketing strategy indexes can be shared by a plurality of salesman.

Also, the mechanically readable medium for recording thereon the program of the present invention can attain the above-mentioned marketing strategy support system of the present invention on the computer.

As discussed above in detail, according to the marketing strategy support system of the present invention, it is possible to indicates an index useful for the marketing strategy which is rather objective and quantitative, and it is also possible for a plurality of salesmen respectively having the client apparatuses to commonly own the index useful for the marketing strategy.

Further, according to the program storage device or the computer data signal embodied in the carrier wave of the present invention, the above described marketing strategy support system of the present invention can be realized on a computer.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosures of Japanese Patent Applications No. Hei. 11-40656, No. Hei. 11-40657 and No. Hei. 11-40658, filed on Feb. 18, 1999 including the specification, claims, drawings and summary are incorporated herein by reference in its entirety.

What is claimed is:

1. A marketing strategy support system having a server apparatus and a plurality of client apparatuses which can be connected through a communication device to the server apparatus, said server apparatus comprising:
  a first file device for storing business customer sales information indicative of a sale Y1 of each business customer with regard to at least two proximate terms;
  a second file device for storing territory sales information indicative of total sales in each territory with regard to said terms;
  a third file device for storing own-product-business customer sale information indicative of a sale of one's own company's product to each business customer with regard to said terms;
  a first calculating device for calculating a deviation value A of the sale Y1 in each business customer, in which all business customers targeted for an analysis are used as a population, in accordance with the business customer sales information stored in said first file device;
  a second calculating device for calculating a change rate Y2 to a term of the total sales in each territory indicated by the territory sales information stored in said second file device as an index indicative of a growth of a total buying power in each territory, and also calculating a deviation value B of the change rate Y2 in each territory, in which all territories targeted for the analysis are used as a population;
  a third calculating device for calculating a sale X1 on an actually sold base corresponding to a sale of one's own company's product to each business customer in accordance with the own-product-business customer sale information stored in said third file device, and also calculating a deviation value C of the sale X1 in each business customer, in which said all business customers are used as a population;
  a fourth calculating device for calculating a change rate X2 to a term of the sale X1 as an index indicative of a growth of a selling power in each business customer, and also calculating a deviation value D of the change rate X2 in each business customer, in which said all business customers are used as a population;
  a fifth calculating device for calculating a PPM (Product Portfolio Management) parameter Y indicative of an attractiveness of each business customer as a weighted average of the deviation values A and B, and also calculating a PPM parameter X indicative of one's own company's strength of each business customer as a weighted average of said deviation values C and D;
  a fourth file device for storing the calculated PPM parameters Y and X in correlation with each business customer; and
  a server side modem for transmitting the PPM parameters Y and X stored in said fourth file device, through said communication device to said client apparatus, in response to a request from said client apparatus, and
each of said client apparatuses comprising:
  a client side modem for obtaining the PPM parameters Y and X stored in said fourth file device through said communication device and said server side modem;
  a display device for displaying a scatter diagram in which the obtained PPM parameters Y and X are plotted on X-Y coordinates; and
  a judging device for judging, based on the obtained PPM parameters Y and X, whether or not one's own company's product is being sold to a given business customer at a predetermined proportion of the selling power of said given business customer.

2. A marketing strategy support system according to claim 1, wherein
each of said client apparatuses further comprises an input device for inputting condition data indicative of a condition of specifying the PPM parameters Y and X corresponding to a desirable marketing strategy analysis target among the PPM parameters Y and X stored in said fourth file device, said client side modem transmits the condition data inputted through said input device through said communication device to said server side modem, said server side modem receives the transmitted condition data, said server apparatus further comprises an extractor for extracting the PPM parameters Y and X meeting the condition represented by the received condition data from said fourth file device, said server side modem transmits the extracted PPM parameters Y and X through said communication device to said client side modem, and said display device displays the scatter diagram in accordance with the PPM parameters Y and X received by said client side modem.

3. A marketing strategy support system according to claim 1, wherein at least one of said server apparatus and said plurality of client apparatuses further comprises a setting device for setting at least one of a configuration ratio of the weighted average when said PPM parameter Y is calculated and a configuration ratio of the weighted average when said PPM parameter X is calculated.

4. A marketing strategy support system according to claim 1, wherein said display device displays the scatter diagram in the scales respectively corresponding to the maximum values and the minimum values of the received PPM parameters Y and X.

5. A marketing strategy support system according to claim 1, wherein each of said plurality of client apparatuses further comprises a specifying device for specifying an indication range of the scatter diagram.

6. A marketing strategy support system according to claim 1, wherein, when obtaining at least one of the business customer sales information, the territory sales information and the own-product-business customer sale information which are respectively stored in said first, second and third file devices through said communication device, said display device displays the obtained information together with a name of a business customer corresponding to the obtained information in a predetermined format.

7. A marketing strategy support system according to claim 6, wherein, when a point plotted on the scatter diagram is specified, said display device displays information corresponding to the specified point among the obtained information together with the business customer name in the predetermined format.

8. A marketing strategy support system according to claim 1, wherein, when the point plotted on the scatter diagram is specified, said display device displays a map in which a predetermined mark overlaps with a position of the business customer corresponding to the specified point in accordance with a map data.

9. A marketing strategy support system according to claim 1, wherein said server apparatus further comprises a fifth file device for storing rough profit information indicative of a rough profit of each business customer in correlation with each business customer, and said third calculating device calculates the sale X1 on the actually sold base in accordance with the rough profit information stored in said fifth file.

10. A marketing strategy support system according to claim 1, wherein said first calculating device calculates, in accordance with product ratio information indicative of a ratio of a sales values of a specific product group with respect to a total sales value for each business customer in addition to the business customer sales information stored in said first file device, the deviation value A of a specific product group sale Y1', which is obtained by multiplying the sale Y1 with the ratio of the sales values of the specific product group for each business customer, in place of the sale Y1.

11. A marketing strategy support system according to claim 1, wherein said server apparatus further comprises a taking-in device for taking-in the business customer sales information through said communication device from an information source, in which the business customer sales information is accumulated, and said third file device updates a content thereof by the taken-in business customer sales information.

12. A marketing strategy support system having a server apparatus and a plurality of client apparatuses which can be connected through a communication device to the server apparatus, said server apparatus comprising:

a first file device for storing business customer sales information indicative of a sale Y1 of each business customer with regard to at least two proximate terms;

a second file device for storing territory sales information indicative of total sales in each territory with regard to said terms;

a third file device for storing own-product-business customer sale information indicative of a sale of one's own company's product to each business customer with regard to said terms;

a first calculating device for calculating a deviation value A of the sale Y1 in each business customer, in which all business customers targeted for an analysis are used as a population, in accordance with the business customer sales information stored in said first file device;

a second calculating device for calculating a change rate Y2 to a term of the total sales in each territory indicated by the territory sales information stored in said second file device as an index indicative of a growth of a total buying power in each territory, and also calculating a deviation value B of the change rate Y2 in each territory, in which all territories targeted for the analysis are used as a population;

a third calculating device for calculating a PPM parameter Y indicative of an attractiveness of each business customer as a weighted average of the deviation values A and B;

a fourth file device for storing the calculated PPM parameter Y in correlation with each business customer;

an inputting device for inputting master budget data indicative of a master budget M1, which is an annual target sales value of one's own company, and monthly configuration ratio data indicative of a monthly configuration ratio of the annual target sales value;

a fourth calculating device for converting the inputted master budget M1 to a master budget M2 on an actually sold base, on the basis of the own-product-business customer sales information stored in said third file device;

a fifth calculating device for distributing the master budget M2 on the actually sold base to each business customer as a business customer budget m2 on an actually sold base, in accordance with the PPM parameter Y stored in said fourth file device;

a sixth calculating device for converting the distributed business customer budget m2 to a business customer budget m1 on a sales base for each business customer;

a seventh calculating device for allocating the business customer budget m1 on the sales base to each month for each business customer in accordance with the monthly configuration ratio indicated by the inputted monthly configuration ratio data;

a fifth file device for storing individual budget information indicative of the business customer budget m1 distributed to each month in correlation with each business customer; and a server side modem for transmitting the individual budget information stored in said fifth file device, through said communication device to said client apparatus, in response to a request from said client apparatus, and each of said client apparatuses comprising:

a client side modem for obtaining the individual budget information stored in said fifth file device through said communication device and said server side modem;

a display device for displaying the obtained individual budget information in a predetermined format; and a determining device for determining the budget for each business customer in accordance with the obtained individual budget information.

13. A marketing strategy support system according to claim 12, wherein said inputting device is adapted to distribute as a business customer budget the master budget M1 to one or a plurality of business customers of an analysis non-target among all business customers, said fourth calculating device converts, in place of the inputted master budget M1, a portion M1' other than the business customer budget for the business customer or customers of the analysis non-target in the master budget M1, to the master budget M2 on the actually sold base, and said seventh calculating device allocates one portion of the master budget M1 distributed to the business customer or customers of the analysis non-target, to each month, in accordance with the monthly configuration ratio indicated by the inputted monthly configuration ratio data.

14. A marketing strategy support system according to claim 12, wherein each of said client apparatuses further comprises an input device for inputting condition data indicative of a condition of specifying the individual budget information corresponding to a desirable marketing strategy analysis target among the individual budget information stored in said fifth file device, said client side modem transmits the condition data inputted through said input device through said communication device to said server side modem, said server side modem receives the transmitted condition data, said server apparatus further comprises an extractor for extracting the individual budget information meeting the condition represented by the received condition data from said fifth file device, said server side modem transmits the extracted individual budget information through said communication device to said client side modem, and said display device displays the individual budget information received by said client side modem.

15. A marketing strategy support system according to claim 12, wherein at least one of said server apparatus and said plurality of client apparatuses further comprises a setting device for setting a configuration ratio of the weighted average when said PPM parameter Y is calculated.

16. A marketing strategy support system according to claim 12, wherein said server apparatus further comprises a sixth file device for storing rough profit information indicative of a rough profit in correlation with each business customer, said fourth calculating device converts the inputted master budget M1 to the master budget M2 on the actually sold base, on the basis of the rough profit information stored in said sixth file device, and said six calculating device converts the distributed business customer budget m2 to the business customer budget m1 on the sales base on the basis of the rough profit information stored in said sixth file device.

17. A marketing strategy support system according to claim 12, wherein, when obtaining at least one of the business customer sales information, the territory sales information and the own-product-business customer sale information which are respectively stored in said first, second and third file devices through said communication device, said display device displays the obtained information together with a name of a business customer corresponding to the obtained information in a predetermined format.

18. A marketing strategy support system according to claim 12, wherein said first calculating device calculates, in accordance with product ratio information indicative of a ratio of a sales values of a specific product group with respect to a total sales value for each business customer in addition to the business customer sales information stored in said first file device, the deviation value A of a specific product group sale Y1', which is obtained by multiplying the sale Y1 with the ratio of the sales values of the specific product group for each business customer, in place of the sale Y1.

19. A marketing strategy support system according to claim 12, herein said server apparatus further comprises a taking-in device for taking-in the business customer sales information through said communication device from an information source, in which the business customer sales information is accumulated, and said third file device updates a content thereof by the taken-in business customer sales information.

20. A marketing strategy support system comprising:

a first file device for storing business customer sales information indicative of a sale Y1 of each business customer with regard to at least two proximate terms;

a second file device for storing territory sales information indicative of total sales in each territory with regard to said terms;

a third file device for storing own-product-business customer sale information indicative of a sale of one's own company's product to each business customer with regard to said terms;

a first calculating device for calculating a deviation value "A" of the sale Y1 in each business customer, in which all business customers targeted for an analysis are used as a population, in accordance with the business customer sales information stored in said first file device;

a second calculating device for calculating a change rate Y2 to a term of the total sales in each territory indicated by the territory sales information stored in said second file device as an index indicative of a growth of a total buying power in each territory, and also calculating a deviation value "B" of the change rate Y2 in each territory, in which all territories targeted for the analysis are used as a population;

a third calculating device for calculating a PPM parameter Y indicative of an attractiveness of each business customer as a weighted average of the deviation values A and B;

a fourth file device for storing the calculated PPM parameter Y in correlation with each business customer;

an inputting device for inputting master budget data indicative of a master budget M1, which is an annual target sales value of one's own company, and monthly configuration ratio data indicative of a monthly configuration ratio of the annual target sales value;

a fourth calculating device for converting the inputted master budget M1 to a master budget M2 on an actually sold base, on the basis of the own-product-business customer sales information stored in said third file device;

a fifth calculating device for distributing the master budget M2 on the actually sold base to each business customer as a business customer budget m2 on an actually sold base, in accordance with the PPM parameter Y stored in said fourth file device;

a sixth calculating device for converting the distributed business customer budget m2 to a business customer budget m1 on a sales base for each business customer;

a seventh calculating device for allocating the business customer budget m1 on the sales base to each month for each business customer in accordance with the monthly configuration ratio indicated by the inputted monthly configuration ratio data;

a fifth file device for storing individual budget information indicative of the business customer budget m1 distributed to each month in correlation with each business customer; and a determining device for determining the budget for each business customer in accordance with individual budget information.

21. A program storage device readable by a computer, tangibly embodying a program of instructions executable by the computer to perform method processes for transmitting PPM parameters Y and X to a plurality of client apparatuses, each of which is connectable to said server apparatus through a communication device and comprises a client side modem for obtaining the PPM parameters Y and X through said communication device and a display device for displaying a scatter diagram in which the obtained PPM parameters Y and X are plotted on X-Y coordinates, said method processes comprising:

a first file process of storing business customer sales information indicative of a sale Y1 of each business customer with regard to at least two proximate terms;

a second file process of storing territory sales information indicative of total sales in each territory with regard to said terms;

a third file process of storing own-product-business customer sale information indicative of a sale of one's own company's product to each business customer with regard to said terms;

a first calculating process of calculating a deviation value A of the sale Y1 in each business customer, in which all business customers targeted for an analysis are used as a population, in accordance with the business customer sales information stored by said first file process;

a second calculating process of calculating a change rate Y2 to a term of the total sales in each territory indicated by the territory sales information stored by said second file process as an index indicative of a growth of a total buying power in each territory, and also calculating a deviation value B of the change rate Y2 in each territory, in which all territories targeted for the analysis are used as a population;

a third calculating process of calculating a sale X1 on an actually sold base corresponding to a sale of one's own company's product to each business customer in accordance with the own-product-business customer sale information stored by said third file process, and also calculating a deviation value C of the sale X1 in each business customer, in which said all business customers are used as a population;

a fourth calculating process of calculating a change rate X2 to a term of the sale X1 as an index indicative of a growth of a selling power in each business customer, and also calculating a deviation value D of the change rate X2 in each business customer, in which said all business customers are used as a population;

a fifth calculating process of calculating a PPM parameter Y indicative of an attractiveness of each business customer as a weighted average of the deviation values A and B, and also calculating a PPM parameter X indicative of one's own company's strength of each business customer as a weighted average of said deviation values C and D;

a fourth file process of storing the calculated PPM parameters Y and X in correlation with each business customer;

a transmitting process of transmitting the PPM parameters Y and X stored by said fourth file process, through said communication device to said client apparatus, in response to a request from said client apparatus; and a judging device for judging, based on the obtained PPM parameters Y and X, whether or not one's own company's product is being sold to a given business customer at a predetermined proportion of the selling power of said given business customer.

22. A program storage device readable by a computer, tangibly embodying a program of instructions executable by the computer to perform method processes for transmitting individual business customer budget information to a plurality of client apparatuses, each of which is connectable to said server apparatus through a communication device and comprises a client side modem for obtaining the individual business customer information through said communication device and a display device for displaying the obtained individual business customer budget information in a predetermined format, said method processes comprising:

a first file process of storing business customer sales information indicative of a sale Y1 of each business customer with regard to at least two proximate terms;

a second file process of storing territory sales information indicative of total sales in each territory with regard to said terms;

a third file process of storing own-product-business customer sale information indicative of a sale of one's own company's product to each business customer with regard to said terms;

a first calculating process of calculating a deviation value A of the sale Y1 in each business customer, in which all business customers targeted for an analysis are used as a population, in accordance with the business customer sales information stored by said first file process;

a second calculating process of calculating a change rate Y2 to a term of the total sales in each territory indicated by the territory sales information stored by said second file process as an index indicative of a growth of a total buying power in each territory, and also calculating a deviation value B of the change rate Y2 in each territory, in which all territories targeted for the analysis are used as a population;

a third calculating process of calculating a PPM parameter Y indicative of an attractiveness of each business customer as a weighted average of the deviation values A and B;

a fourth file process of storing the calculated PPM parameter Y in correlation with each business customer;

an inputting process of inputting master budget data indicative of a master budget M1, which is an annual target sales value of one's own company, and monthly configuration ratio data indicative of a monthly configuration ratio of the annual target sales value;

a fourth calculating process of converting the inputted master budget M1 to a master budget M2 on an actually sold base, on the basis of the own-product-business customer sales information stored by said third file process;

a fifth calculating process of distributing the master budget M2 on the actually sold base to each business customer as a business customer budget m2 on an actually sold base, in accordance with the PPM parameter Y stored by said fourth file process;

a sixth calculating process of converting the distributed business customer budget m2 to a business customer budget m1 on a sales base for each business customer;

a seventh calculating process of allocating the business customer budget m1 on the sales base to each month for each business customer in accordance with the monthly configuration ratio indicated by the inputted monthly configuration ratio data;

a fifth file process of storing individual budget information indicative of the business customer budget m1 distributed to each month in correlation with each business customer;

a transmitting process for transmitting the individual budget information stored by said fifth file process, through said communication device to said client apparatus, in response to a request from said client apparatus; and a determining device for determining the budget for each business customer in accordance with individual budget information.

23. A computer data signal embodied in a carrier wave and representing a series of instructions which cause a computer to perform method processes for transmitting PPM parameters Y and X to a plurality of client apparatuses, each of which is connectable to said server apparatus through a communication device and comprises a client side modem for obtaining the PPM parameters Y and X through said communication device and a display device for displaying a scatter diagram in which the obtained PPM parameters Y and X are plotted on X-Y coordinates, said method processes comprising:

a first file process of storing business customer sales information indicative of a sale Y1 of each business customer with regard to at least two proximate terms;

a second file process of storing territory sales information indicative of total sales in each territory with regard to said terms;

a third file process of storing own-product-business customer sale information indicative of a sale of one's own company's product to each business customer with regard to said terms;

a first calculating process of calculating a deviation value A of the sale Y1 in each business customer, in which all business customers targeted for an analysis are used as a population, in accordance with the business customer sales information stored by said first file process;

a second calculating process of calculating a change rate Y2 to a term of the total sales in each territory indicated by the territory sales information stored by said second file process as an index indicative of a growth of a total buying power in each territory, and also calculating a deviation value B of the change rate Y2 in each territory, in which all territories targeted for the analysis are used as a population;

a third calculating process of calculating a sale X1 on an actually sold base corresponding to a sale of one's own company's product to each business customer in accordance with the own-product-business customer sale information stored by said third file process, and also calculating a deviation value C of the sale X1 in each business customer, in which said all business customers are used as a population;

a fourth calculating process of calculating a change rate X2 to a term of the sale X1 as an index indicative of a growth of a selling power in each business customer, and also calculating a deviation value D of the change rate X2 in each business customer, in which said all business customers are used as a population;

a fifth calculating process of calculating a PPM parameter Y indicative of an attractiveness of each business customer as a weighted average of the deviation values A and B, and also calculating a PPM parameter X indicative of one's own company's strength of each business customer as a weighted average of said deviation values C and D;

a fourth file process of storing the calculated PPM parameters Y and X in correlation with each business customer;

a transmitting process of transmitting the PPM parameters Y and X stored by said fourth file process, through said communication device to said client apparatus, in response to a request from said client apparatus; and a judging device for judging, based on the obtained PPM parameters Y and X, whether or not one's own company's product is being sold to a given business customer at a predetermined proportion of the selling power of said given business customer.

24. A computer data signal embodied in a carrier wave and representing a series of instructions which cause a computer to perform method processes for transmitting individual business customer budget information to a plurality of client apparatuses, each of which is connectable to said server apparatus through a communication device and comprises a client side modem for obtaining the individual business customer information through said communication device and a display device for displaying the obtained individual business customer budget information in a predetermined format, said method processes comprising:

- a first file process of storing business customer sales information indicative of a sale Y1 of each business customer with regard to at least two proximate terms;
- a second file process of storing territory sales information indicative of total sales in each territory with regard to said terms;
- a third file process of storing own-product-business customer sale information indicative of a sale of one's own company's product to each business customer with regard to said terms;
- a first calculating process of calculating a deviation value A of the sale Y1 in each business customer, in which all business customers targeted for an analysis are used as a population, in accordance with the business customer sales information stored by said first file process;
- a second calculating process of calculating a change rate Y2 to a term of the total sales in each territory indicated by the territory sales information stored by said second file process as an index indicative of a growth of a total buying power in each territory, and also calculating a deviation value B of the change rate Y2 in each territory, in which all territories targeted for the analysis are used as a population;
- a third calculating process of calculating a PPM parameter Y indicative of an attractiveness of each business customer as a weighted average of the deviation values A and B;
- a fourth file process of storing the calculated PPM parameter Y in correlation with each business customer;
- an inputting process of inputting master budget data indicative of a master budget M1, which is an annual target sales value of one's own company, and monthly configuration ratio data indicative of a monthly configuration ratio of the annual target sales value;
- a fourth calculating process of converting the inputted master budget M1 to a master budget M2 on an actually sold base, on the basis of the own-product-business customer sales information stored by said third file process;
- a fifth calculating process of distributing the master budget M2 on the actually sold base to each business customer as a business customer budget m2 on an actually sold base, in accordance with the PPM parameter Y stored by said fourth file process;
- a sixth calculating process of converting the distributed business customer budget m2 to a business customer budget m1 on a sales base for each business customer;
- a seventh calculating process of allocating the business customer budget m1 on the sales base to each month for each business customer in accordance with the monthly configuration ratio indicated by the inputted monthly configuration ratio data;
- a fifth file process of storing individual budget information indicative of the business customer budget m1 distributed to each month in correlation with each business customer;
- a transmitting process for transmitting the individual budget information stored by said fifth file process, through said communication device to said client apparatus, in response to a request from said client apparatus; and
- a determining device for determining the budget for each business customer in accordance with the obtained individual budget information.

* * * * *